(12) United States Patent
Koubaa

(10) Patent No.: US 11,473,913 B2
(45) Date of Patent: Oct. 18, 2022

(54) SYSTEM AND METHOD FOR SERVICE ORIENTED CLOUD BASED MANAGEMENT OF INTERNET OF DRONES

(71) Applicant: Prince Sultan University, Riyadh (SA)

(72) Inventor: Anis Koubaa, Riyadh (SA)

(73) Assignee: Prince Sultan University, Riyadh (SA)

(*) Notice: Subject to any disclaimer, the term of this patent is extended or adjusted under 35 U.S.C. 154(b) by 222 days.

(21) Appl. No.: 16/790,233

(22) Filed: Feb. 13, 2020

(65) Prior Publication Data

US 2021/0088337 A1 Mar. 25, 2021

Related U.S. Application Data

(60) Provisional application No. 62/903,277, filed on Sep. 20, 2019.

(51) Int. Cl.
*G01C 21/20* (2006.01)
*H04L 67/10* (2022.01)
(Continued)

(52) U.S. Cl.
CPC ............ *G01C 21/20* (2013.01); *B64C 39/024* (2013.01); *G05D 1/0022* (2013.01);
(Continued)

(58) Field of Classification Search
CPC .................................................... G01C 21/20
See application file for complete search history.

(56) References Cited

U.S. PATENT DOCUMENTS 8,788,121 B2 7/2014 Klinger
9,147,219 B2 * 9/2015 Binion .................. G08G 1/162
(Continued)

FOREIGN PATENT DOCUMENTS

CN 109121139 A 1/2019
EP 3251108 A1 * 12/2017 ............. G05D 1/102

OTHER PUBLICATIONS

NPL, Lui, Yecheng et al., A virtual-waypoint based artificial potential field method for UAV path planning, 2016 IEEE Chinese Guidance, Navigation and Control Conference (CGNCC)( https://ieeexplore.ieee.org/abstract/document/7828913) (hereinafter "Yecheng").*

(Continued)

*Primary Examiner* — Jean Paul Cass
(74) *Attorney, Agent, or Firm* — Oblon, McClelland, Maier & Neustadt, L.L.P.

(57) ABSTRACT

A Internet protocol-based unmanned aerial vehicle (UAV) management system and method is disclosed that includes UAVs including a communication chip, a user computer, a cloud-based service for performing a virtual UAV. The method includes storing a plurality of pre-planned missions, controlling communication between the UAV and the user computer, mapping the UAV to the virtual UAV, assigning a mission to include multiple waypoints, and allocating the task at the multiple waypoints. Dynamic mission planning of the assigned mission is performed to generate planned paths for performing the task. Operation of the UAV is controlled by way of the corresponding virtual UAV including receiving messages and commands for the mission from the user computer, sending control commands to the UAV, receiving data signals from the UAV, and transmitting location and status of performance of the task for the UAV. The cloud-based service performs image processing using the received data signals.

18 Claims, 34 Drawing Sheets

(51) Int. Cl.

| | |
|---|---|
| *H04L 67/12* | (2022.01) |
| *H04L 67/306* | (2022.01) |
| *G08G 5/00* | (2006.01) |
| *B64C 39/02* | (2006.01) |
| *G05D 1/00* | (2006.01) |
| *G05D 1/10* | (2006.01) |
| *G08G 5/04* | (2006.01) |
| *H04L 61/5007* | (2022.01) |
| *B64D 47/08* | (2006.01) |

(52) U.S. Cl.
CPC ......... *G05D 1/1064* (2019.05); *G08G 5/0069* (2013.01); *G08G 5/045* (2013.01); *H04L 61/5007* (2022.05); *H04L 67/10* (2013.01); *H04L 67/12* (2013.01); *H04L 67/306* (2013.01); *B64C 2201/027* (2013.01); *B64C 2201/126* (2013.01); *B64C 2201/146* (2013.01); *B64D 47/08* (2013.01)

(56) References Cited

U.S. PATENT DOCUMENTS

| | | | |
|---|---|---|---|
| 9,449,017 B2 * | 9/2016 | Pitts | G06F 16/148 |
| 9,565,403 B1 * | 2/2017 | Higgins | G06V 20/17 |
| 9,728,089 B2 | 8/2017 | Marcus | |
| 9,927,807 B1 | 3/2018 | Ganjoo | |
| 10,134,298 B2 * | 11/2018 | Tao | G09B 9/46 |
| 10,943,414 B1 * | 3/2021 | Nygaard | G07C 5/0841 |
| 2017/0069214 A1 | 3/2017 | Depray et al. | |
| 2022/0075375 A1 * | 3/2022 | Michini | G08G 5/006 |

OTHER PUBLICATIONS

Koubaa, et al. ; A Service-Oriented Cloud-Based Management System for the Internet-of-Drones ; CISTER Research Centre in Real-Time & Embedded Computing Systems ; Apr. 26, 2017 ; 9 Pages.

Hof, et al. ; AnDrone: Virtual Drone Computing in the Cloud ; ACM ; Mar. 25-28, 2019 ; 16 Pages.

Gharibi, et al. ; Internet of Drones ; IEEEAccess ; Mar. 2, 2016 ; 15 Pages.

Stevens, et al. ; Platform-Independent Geofencing for Low Altitude UAS Operations ; 15$^{th}$ AIAA Aviation Technology, Integration, and Operations Conference ; Jun. 22-26, 2015 ; 18 Pages.

Nicholas Shields ; Walmart is exploring blockchain for drone delivery ; Business Insider ; Sep. 5, 2018 ; 4 Pages.

Robots With Their Heads in the Clouds ; IEEE Spectrum ; Mar. 2011 ; 2 Pages.

Koubaa, et al. ; Move and Improve: a Market-Based Mechanism for the Multiple Depot Multiple Travelling Salesmen Problem ; J Intell Robot Syst; Jul. 15, 2016 ; 24 Pages.

Koubaa, et al. ; ROSLink: Bridging ROS with the Internet-of-Things for cloud robotics ; Studies in Computational Intelligence ; May 2017 ; 21 Pages.

Koubaa, et al. ; Turtlebot at Office: A Service-Oriented Software Architecture for Personal Assistant Robots using ROS ; International Conference on Autonomous Robot Systems and Competitions ; 2016 ; 7 Pages.

Koubaa, et al. ; A Service-Oriented Architecture for Virtualizing Robots in Robot-as-a-Service Clouds ; Conference Paper ; Feb. 2014 ; 14 Pages.

Koubaa, et al. ; A Service-Oriented Cloud-Based Management System for the Internet-of-Drones ; Autonomous Robot Systems and Competitions ; Apr. 26-28, 2017 ; 7 Pages.

\* cited by examiner

Algorithm 2 Phase 1-Target Allocation.

| | |
|---|---|
| 1: | Available Targets List = All targets to be visited |
| 2: | $R_i$ Allocated Targets List = ∅ |
| 3: | while Available Targets List ≠ ∅ do |
| 4: |   Compute cost from current position to each available target |
| 5: |   Select the target with the lowest cost |
| 6: |   repeat |
| 7: |     Discover neighbor robots |
| 8: |     if neighbor ≠ ∅ then |
| 9: |       Communicate with neighbor(s) and update list of available targets |
| 10: |       if selected target ∉ available targets then |
| 11: |         go to line 3: |
| 12: |         *{the selected target was already allocated to another robot}* |
| 13: |       end if |
| 14: |       Bid on the selected target |
| 15: |       if cost of robot $ri$ > cost of robot $rj$, where $rj$ is a neighbor of $ri$ then |
| 16: |         go to line 3: |
| 17: |         *{the target can be visited by other robot with minimum cost}* |
| 18: |       end if |
| 19: |     end if |
| 20: |     Move robot to the selected target |
| 21: |   until Robot reach the selected target |
| 22: |   Add target to the set of allocated targets |
| 23: |   Remove target from the set of available targets |
| 24: | end while |

FIG. 12

Algorithm 3 Phase 2-Tour Construction.

1:    call tsp (Allocated targets)(where tsp is a travelling sales-men solver)

FIG. 13

Algorithm 4 Phase 3-Overlapped Targets Elimination.

1:    TourDone=false *{indicates if a total tour is done}*
2:    current position=depot *{position the robot to the first target of the tour, i.e, the depot }*
3:    repeat
4:      Search for neighbor robots
5:      if neighbors ≠ ∅ then
6:        Exchange list of Allocated targets with neighbors
7:        Common targets=Allocated targets ∩(∪ {neighbors' Allocated targets})
8:        for all $t_i \notin$ common targets do
9:          Bid on $t_i$
10:          if I am not the winner of $t_i$ then
11:            remove $t_i$ from Allocated target
12:            call tsp (Allocated targets) *{construct the new tour}*
13:            current position=depot
14:            TourDone=false
15:          end if
16:        end for
17:      end if
18:      Move robot to next target
19:      if current position==depot then
20:        TourDone=true
21:      end if
22:    until TourDone

FIG. 14

Algorithm 5 Phase 4- Solution Improvement.

1:    TourDone=false *{indicates if a total tour is done}*
2:    current position=depot *{position the robot to the first target of the tour, i.e, the depot }*
3:    repeat
4:      Search for neighbor robots
5:      if neighbors ≠ ∅ then
6:        select the worst allocated targest *(tw)* (the one that have the worst cost).
7:        Bid on *tw*
8:        if I am not the winner of *tw* then
9:          remove *tw* from Allocated target
10:         call tsp (Allocated targets) *{construct the new tour}*
11:         current position=depot
12:         TourDone=false
13:        end if
14:      end if
15:      Move robot to next target
16:      if current position==depot then
17:        TourDone=true
18:      end if
19:    until TourDone

FIG. 15

| Platforms Available | | | | | | 🏠 Home > Drones > Available | |
|---|---|---|---|---|---|---|---|
| List of drones | | | | | | Search 🔍 | |
| ID | IP | Port | Mode | Battery | Status | Address | Last Update | Link... |
| 2 | 192.168.8.104 | 35638 | STABLIZED_DISARMED | 100 | 3 | Xu Jia Hui Lu, Shanghai, China | 2016-08-02T20:32:45.419+01:00 | 🔗 |
| 1 | 192.168.8.104 | 55881 | STABLIZED_DISARMED | 100 | 3 | مملكة العربية Riyadh, Saudi Arabia | 2016-08-02T20:32:45.263+01:00 | 🔗 |
| 3 | 192.168.8.104 | 57392 | STABLIZED_DISARMED | 100 | 3 | Rua Alfredo Allen, Porto, Portugal | 2016-08-02T20:32:45.132+01:00 | 🔗 |
| Get Drones | | | | | | | |

FIG. 16

```
▽ <binding xmlns:nsl="http://cloud.dronemap.org/wsdl"
   name="MAVLinkControllerWSImplPortBinding"
   type="nsl:MAVLink Action Web Service">
    <soap:binding
    transport="http://schemas.xmlsoap.org/soap/http"
    style="document"/>
  ▽ <operation name= "takeoff">
      <soap:operation soapAction=""/>
    ▽ <input>
        <soap:body use="literal"/>
      </input>
    ▽ <output>
        <soap:body use="literal"/>
      </output>
    </operation>
```

FIG. 18

| <<Class>> |
| --- |
| DroneClient |
| - serverIP : String<br>- hostID : String<br>- droneClient: DroneWSClientImpl<br>- cloudClient: CloudWSClientImpl<br>- droneWebsocketsClient: DroneWebsocketsClient |
| + DroneClient (String serverIP )<br>+ connect (int systemid): boolean<br>+ getDroneHostID( ): String<br>+ arm( ): void<br>+ disarm( ): void<br>+ takeoff (double altitude): void<br>+ land( ): void<br>+ flightMode (int flight_mode): void<br>+ goToGoal (Location3D location): void |

FIG. 21A

```
1   public static void main(String [ ] args) throws ↵
          InterruptedException{
2   Gson gson = new Gson ();
3   DroneClient drone = new DroneClient("192.168.1.102");
4   if (drone.connect(1)){
5       System.out.println(drone.getDroneHostID(droneID));
6       System.out.println(drone.getRemainingBatteryLevel( ↵
            (droneID));
7       System.out.println(drone.getDroneHostID(1));
8       drone.flightMode(Config.MAVLINK_SET_MODE_GUIDED);
9       Thread.sleep(5000);
10      drone.arm();
11      Thread.sleep(5000);
12      drone.takeoff(20.3);
13      Thread.sleep(10000);
14      Location3D location = new Location3D(24.734840, ↵
            46.698421, 25.0);
15      drone.goToGoal(gson.toJson(location));
16      Thread.sleep(40000);
17      drone.flightMode(Config.MAVLINK_SET_MODE_RTL);
18  }
```

Listing 1. Sample drone client mission control java program.

FIG. 21B

```
{"type": uint8_t,
 "autopilot": uint8_t,
 "base_mode": uint8_t,
 "custom_mode": uint32_t,
 "system_status": uint8_t,
 "mavlink_version": uint8_t,}
```

Listing 2. MAVLink heartbeat message structure.

```
{"onboard_control_sensors_present": uint32_t,
 "onboard_control_sensors_enabled": uint32_t,
 "onboard_control_sensors_health": uint32_t,
 "load": uint16_t,
 "voltage_battery": uint16_t,
 "current_battery": int16_t,
 "battery_remaining": int8_t,
 "drop_rate_comm": uint16_t,
 "errors_comm": uint16_t,
 "errors_count1": uint16_t,
 "errors_count2": uint16_t,
 "errors_count3": uint16_t,
 "errors_count4": uint16_t, }
```

Listing 3. MAVLink system status message.

```
{"time_boot_ms7": uint32_t,
 "lat": int32_t,
 "lon": int32_t,
 "alt": int32_t,
 "relative_alt": int32_t,
 "vx": int16_t,
 "vy": int16_t,
 "vz": int16_t,
 "hdg": uint16_t,}
```

Listing 4. MAVLink global position message.

FIG. 28

```
{"roslink_version": int8,
"roslink_version": int8,
"system_id": int16,
"message_id": 0,
"sequence_number": int64,
"payload": { "type": int8
"name": String,
"system_status": int8,
"owner_id": String,
"mode": int8 }
}
```

Listing 5. ROSLink heartbeat message structure.

```
{"roslink_version": int8,
"roslink_version": int8,
"system_id": int16,
"message_id": 1,
"sequence_number": int64,
"payload": { "onboard_control_sensors_present": uint3 ↵
    2,
"onboard_control_sensors_enabled": uint32,
"voltage_battery": uint16,
"current_battery": int16,
"battery_remaining": int8, }
}
```

Listing 6. ROSLink robot status message structure.

```
{"roslink_version": int8,
"roslink_version" :int8,
"system_id ": int16,
"message_id": int8,
"sequence_number": int64,
"payload": {"time_boot_ms": uint32
```

FIG. 29

```
"x": float64,
"y": float64,
"z": float64,
"vx": float64,
"vy": float64,
"vz": float64,
"wx": float64,
"wy": float64,
"wz": float64,
"pitch" : float64,
"roll" : float64,
"yaw": float64,}
}
```

Listing 7. ROSLink global motion message structure.

FIG. 29 (Cont'd)

```
{"roslink_version": int8,
"ros_version": int8,
"system_id": int16,
"message_id": int8,
"sequence_number": int64,
"payload": { "time_usec": int64,
"angle_min": float32,
"angle_max": float32,
"angle_increment": float32,
"time_increment": float32,
"scan_time": float32,
"range_min": float32,
"range_max": float32,
"ranges": float32 [ ],
"intensities": float32 [ ],}
}
```

Listing 8. Range finder data message structure.

FIG. 30

SYSTEM AND METHOD FOR SERVICE ORIENTED CLOUD BASED MANAGEMENT OF INTERNET OF DRONES

CROSS-REFERENCE TO RELATED APPLICATIONS

This application claims the benefit of priority to provisional application No. 62/903,277 filed Sep. 20, 2019, the entire contents of which are incorporated herein by reference.

STATEMENT REGARDING PRIOR DISCLOSURE BY THE INVENTORS

Aspects of this technology are described in an article "Dronemap Planner: A service-oriented cloud-based management system for the Internet-of-Drones," Ad Hoc Networks (2019). The article was published online Sep. 20, 2018, and is herein incorporated by reference in its entirety.

Statement of Acknowledgement

The authors would like to acknowledge the support provided by the Research and Initiative Center at Prince Sultan University, and initial support by King Abdul Aziz City for Science and Technology.

BACKGROUND

Technical Field

The present disclosure is directed to a service-oriented cloud-based drone management system that controls, monitors and communicates with drones over the Internet, in particular that provides access to cloud computing resources for drones to offload heavy computations to virtualized drones accessed through Web services.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Internet-of-Things (IoT) and Cloud Computing have been attracting a lot of interest in the last few years. Among the interest, there have been some discussions of the concept of integrating drones with the Internet and in particular IoT. See M. Gharibi, R. Boutaba, S. L. Waslander, Internet of drones, IEEE Access 4 (2016) 1148-1162, doi: 10.1109/ACCESS.2016.2537208, incorporated herein by reference in its entirety. In Gharibi et al., the authors defined the concept of Internet of Drones (IoD) as a layered control architecture that coordinates the access of drones to controlled airspace and that provides navigation services between locations of interest. An abstract layered architecture and generic services for IoD were disclosed to encourage openness, modularity and interoperability. This approach was based on broadcasting drone information to ground stations located at Zone Service Providers (ZSPs). However, this approach was limited to a high-level description of the architecture and generic services and discussion of benefits. No concrete implementation to demonstrate its feasibility, nor performance evaluation study to illustrate the behavior of the system, was disclosed. In the more general context of cloud robotics, Kehoe et al. surveyed cloud robotics architectures and existing works that attempt to integrate robots with the cloud through the Internet. See B. Kehoe, S. Patil, P. Abbeel, K. Goldberg, A survey of research on cloud robotics and automation, IEEE Trans. Autom. Sci. Eng. 12 (2)(2015) 398-409, doi: 10.1109/TASE.2014.2376492; Y. Chen, Z. Du, M. Garca-Acosta, Robot as a service in cloud computing, in: Proceedings of the 2010 Fifth IEEE International Symposium on Service Oriented System Engineering, USA, 2010, pp. 151-158, doi: 10.1109/SOSE.2010.44; R. Arumugam, V. R. Enti, L. Bingbing, W. Xiaojun, K. Baskaran, F. F. Kong, A. S. Kumar, K. D. Meng, G. W. Kit, Davinci: a cloud computing framework for service robots, in: Proc. Int. Conf. Robot. Autom. (ICRA), 2010, pp. 3084-3089, doi: 10.1109/ROBOT.2010.5509469; M. Waibel, M. Beetz, J. Civera, R. D'Andrea, J. Elfring, D. Gálvez-López, K. Häussermann, R. Janssen, J. M. M. Montiel, A. Perzylo, B. Schiele, M. Tenorth, O. Zweigle, R. V. D. Molengraft, Roboearth, IEEE Rob. Autom. Mag. 18 (2)(2011) 69-82, doi: 10.1109/MRA.2011.941632; and A. Koubia, A service-oriented architecture for virtualizing robots in robot-as-a-service clouds, in: International Conference on Architecture of Computing Systems ARCS, Springer International Publishing, Lübeck, Germany, 2014, pp. 196-208, each incorporated herein by reference in their entirety. Chen et al. disclosed the concept of Robot as a Service (RaaS). Yinong et al. proposed a cloud framework for interacting with robots in the area of service-oriented computing. In Arumugam et al., the authors proposed the DAvinCi system for offloading computation from robots to cloud-based distributed computing system based on Apache Hadoop, but did not address reliability and real-time control. Waibel et al. proposed to build a World Wide Web for Robots for sharing knowledge about actions, objects, and environments between robots, and prototypes were implemented for service robots. Koubâa et al. proposed a SOAP-based service-oriented architecture that virtualizes robotic hardware and software resources and exposes them as services through the Web. In the following disclosure, the terms unmanned aerial vehicles (UAVs) and drones are used interchangeably.

Some literature addresses the integration of drones with the cloud and IoT, referred to as Internet-of-Drones. A conceptual model for the Internet-of-Drones was presented in Gharibi et al. which covered three major networks: cellular network, air traffic control network and Internet. Several general services were provided for different Unmanned Aerial Vehicle (UAV) applications, namely surveillance, delivery, search and rescue. Gharibi et al. does not describe an implementation or realization of this architecture. Other literature provides various approaches to IoD.

Mahmoud et al. proposed a SOA model for collaborative UAVs that included mapping between cloud computing resources and UAVs' resources. See S. Mahmoud, N. Mohamed, Collaborative uavs cloud, in: Proceedings of the International Conference on Unmanned Aircraft Systems (ICUAS'14), Orlando, Fla., USA, 2014, pp. 365-373, doi: 10.1109/ICUAS.2014.6842275, incorporated herein by reference in its entirety. The disclosure provided only a high-level description of the system architecture, components and services without any specific details on their implementation. A RESTful web services model by following a Resource-Oriented Architecture (ROA) approach to represent the resources and services of UAVs has also been disclosed. See S. Mahmoud, N. Mohamed, Broker architecture for collaborative uavs cloud computing, in: 2015 International Conference on Collaboration Technologies and Systems (CTS), 2015, pp. 212-219, doi: 10.1109/CTS.2015.7210423, incorporated herein by reference in its entirety. A broker that dispatches mission requests to available UAVs was disclosed with the broker responsible for managing the UAVs, their missions and their interactions with the client. A small prototype was implemented on an Arduino board that emulates a UAV and its resources. No proof of concept on real drones was disclosed and the feasibility of the approach was not effectively demonstrated.

Mahmoud used an experimental testbed for an emulated Arduino UAV system with several sensors (including temperature and humidity, ultrasonic for distance measurements). See S. Mahmoud, N. Mohamed, J. Al-Jaroodi, Integrating uavs into the cloud using the concept of the web of things, J. Rob. 2015 (2015) 10 pages, doi: 10.1155/2015/631420, incorporated herein by reference in its entirety. RESTful web services were defined and implemented for manipulating each type of sensor through a Web interface. The authors evaluated the performance of their system. However, the experimental setup only applies to a small local network. Real drones communicating with the MAVLink protocol were used to validate the disclosed architecture. See "The MAVLINK Protol".

Bona presented a cloud robotic platform called as FLY4SmartCity that is based on ROS. See G. Ermacora, Advances in Human Robot Interaction for Cloud Robotics applications, Politecnico di Torino, 2016 Ph.D. thesis. doi: 10.6092/polito/porto/2643059, incorporated herein by reference in its entirety. Basic features to create instances of drones as nodes handled by platform manager in terms of planning and event management were disclosed.

Ermacora et al., presents a cloud robotics platform for emergency monitoring based on ROS. See G. Ermacora, A. Toma, B. Bona, M. Chiaberge, M. Silvagni, M. Gaspardone, R. Antonini, A cloud robotics architecture for an emergency management and monitoring service in a smart city environment, in: TEEE/RSJ International Conference of Intelligent Robots and Systems, Tokyo (Japan), 2013, incorporated herein by reference in its entirety. The layered architecture provides services built on API provided by applications built of drone capabilities and adaptation. Drones form the physical layer of the architecture.

AzzarÃ et al. presented an IoT architecture named "VIRTUAL RESOURCES", which allows developers to relocate slices of the application to any intermediate IoT device through the concepts of virtual sensor and virtual actuator using a RESTFUL interfaces. See A. AzzarÃ, L. Mottola, Virtual resources for the internet of things, in: In Proceedings of the IEEE 2nd World Forum on Internet of Things (WF-IoT), Milan, Italy, 2015, pp. 245-250, doi: 10.1109/WF-IoT.2015.7389060, incorporated herein by reference in its entirety. VIRTUAL RESOURCES provide several benefits to developers, including better utilization of network resources that result in higher energy efficiency and lower latencies, a simplification of the application logic at the Cloud, and better separation of concerns throughout the development process.

Chae et al. described an IoT-based command and control mechanism along with automatic landing system. See H. Chae, J. Park, H. Song, Y. Kim, H. Jeong, The iot based automate landing system of a drone for the round-the-clock surveillance solution, in: IEEE International Conference on Advanced Intelligent Mechatronics (AIM), Busan, 2015, pp. 1575-1580, doi: 10.1109/AIM.2015.7222767, incorporated herein by reference in its entirety. The system composed of four types of software: 1) main console server and controller, 2) communication relay for drones, 3) firmware of the landing-field to control active gripper and wireless charging, 4) mobile users application which receives the drones video from the server in real-time. Drones can communicate directly via the Internet with the main server and each of them has a low-cost LTE module. The server displays the received videos from the drones to the administrator and provides the image to a user's mobile device at the same time.

Kriz et al. describe bi-directional packet oriented communication protocols between the UAV and base stations named "UranusLink". See V. Kriz, P. Gabrlik, Uranuslink-communication protocol for uav with small overhead and encryption ability, 13th IFAC IEEE Conf. Programm. Devices Embedd. Syst. 48 (4)(2015) 474-479, doi: 10.1016/j.ifacol.2015.07.080, incorporated herein by reference in its entirety. UranusLink is designed for only small data flow such as control commands to the UAV and telemetry data from it. Also, it provides both unreliable and reliable transfer mechanism that allows secure connection and packet loss detection.

Tripicchio et al. presented a vision-based technique that adapts low-cost commercial camera and can be used with rotatory wings or fixed-wing drones for visual analysis of the soil to recognize the fields plowing type. See P. Tripicchio, M. Satler, G. Dabisias, E. Ruffaldi, C. A. Avizzano, Towards smart farming and sustainable agriculture with drones, in: Proceedings of the 2015 International Conference on Intelligent Environments IE, Prague, Czech Republic, 2015, pp. 140-143, doi: 10.1109/IE.2015.29, incorporated herein by reference in its entirety. To achieve high-fidelity, the classic sensor fusion technique involving GPS integrated with Inertial Navigation Systems (INS) localization estimation adapted to be used along with standard Extended Kalman Filter solution for navigation.

Despite these various approaches for IoD, there is still a need for an IoD that accommodates real-time data and reliability constraints. It is one object of the present disclosure to describe a system for control of unmanned aerial vehicles using a cloud Web service that streamlines complex computations to enable real-time performance of more advanced applications for a scalable number of unmanned aerial vehicles. It is another object to ensure reliable accomplishment of various types of missions involving a number of unmanned aerial vehicles. It is a further object to provide APIs that enable programming of cloud-controlled unmanned aerial vehicles at a high level.

SUMMARY

A Internet protocol-based unmanned aerial vehicle (UAV) management system and method, the system including at least one UAV including a communication chip for communication using the Internet protocol; a user computer client device configured to communicate using the Internet protocol; a cloud-based service having circuitry for performing at least one virtual UAV corresponding to the at least one UAV, the circuitry configured to store in a cloud-based memory a plurality of pre-planned missions including surveillance, disaster recovery, and premises security, each pre-planned mission including at least one task to be performed by the at least one UAV, and control communication between the at least one UAV and the user computer client device using the Internet protocol; the user computer client device configured to map the at least one UAV to the at least one virtual UAV, assign a mission of the plurality of pre-planned missions to include multiple waypoints, and allocate the at least one task at the multiple waypoints; the cloud-based service configured to perform dynamic mission planning of the assigned mission to generate planned paths for performing the at least one task over the multiple waypoints; the circuitry further configured to control operation of the at least one UAV by way of the corresponding virtual UAV that receives messages and commands for the mission from the user computer client device using the Internet protocol, sends control commands to the at least one UAV using the Internet protocol, receives data signals that have been captured by the at least one UAV and sends the received data signals to the cloud-based service, and transmits location and status of performance of the at least one task for the at least one UAV; and the cloud-based service configured to perform image processing using the received data signals.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 12 is an algorithm for the allocation process;

FIG. 13 is an algorithm for the tour construction process;

FIG. 14 is an algorithm for the overlapped targets elimination process;

FIG. 15 is an algorithm for the solution improvement process;

FIG. 16 is a display of drones on a Web ground station in accordance with an exemplary aspect of the disclosure;

FIG. 18 is a listing for a SOAP data structure in accordance with an exemplary aspect of the disclosure;

FIG. 21A is a program listing for a drone mission control;

FIG. 21B is a class diagram for a drone client in accordance with an exemplary aspect of the disclosure;

FIG. 28 is a program listing for a communications protocol in accordance with an exemplary aspect of the disclosure;

FIG. 29 is a program listing for a communications protocol that allows control of drones through the internet in accordance with an exemplary aspect of the disclosure; and FIG. 30 is a listing for a message that carries data about a sensor on the drone in accordance with an exemplary aspect of the disclosure.

DETAILED DESCRIPTION

Figure 1:
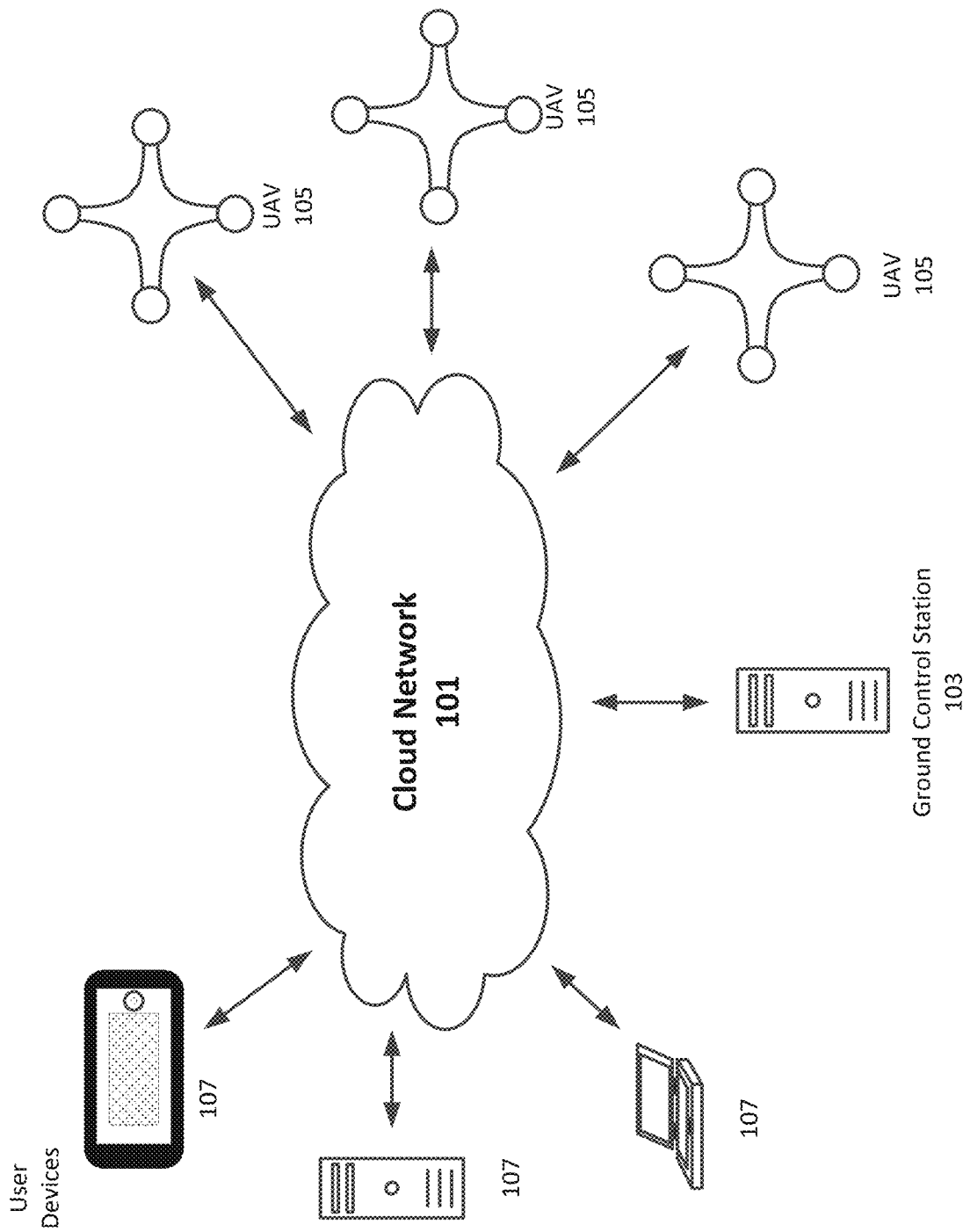
FIG. 1 is a diagram of an integrated system of UAVs and a cloud network in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Unmanned Aerial Vehicles (UAVs) may be used to develop new Internet-of-Things applications (e.g. remote sensing, smart cities, surveillance, disaster management, patrolling, aerial survey, border security, unmanned traffic management, and geofencing, to name a few) by leveraging cloud computing, web technologies, and service-oriented architecture (SOA).

The development of UAVs' applications is typically performed by systems' engineers specializing in embedded systems who typically have knowledge and experience with hardware, drivers, and low level APIs associated with UAVs. Some development frameworks like Robot Operating System (ROS) and DroneKit offer high-level libraries for developing a drone's control applications. These frameworks, while effective, require embedding these programs into the drone onboard computer. As such any change in the program typically requires re-uploading the program to take effect, which may become tedious if changes must occur too often. There are presently no frameworks that provide online programming of the drone.

Disclosed embodiments addresses this gap and provide software developers with new and effective approaches for developing programs for drones at much higher-level than existing frameworks. First, with the disclosed system, software developers do not need to have full knowledge of the drone system, as the cloud enables program development at a higher abstract level. Second, software developers can make changes to the programs for the drones without having to upload it onboard. The cloud provides an interface between the programs and the drone, through the use of Web services.

An advantage of cloud-based drones' missions control is to allow developers to develop applications and interact with drones leveraging the use of cloud Web Services. Software developers may use any of several popular programming languages, as the disclosed cloud Web services are fully supported by most programming languages and the Web services provide necessary high-level APIs to interact with.

The present disclosure garners motivation from the limitations of typical low-cost UAVs having strict constraints on processing and storage capabilities. In fact, low-cost and battery-powered UAVs are typically unable to cope efficiently with the requirements of computation demanding applications (e.g. onboard image processing) that encompass real-time data and reliability constraints. Furthermore, taking into account the limitation of communication range of wireless based drones even when using telemetry systems (with a range up to 5 Km), it is not possible to manage drones missions in large environment areas, for example, at the scale of a city, country or larger. For instance, in Yanmaz et al., the authors developed an interesting networked drone system for different types of applications. However, communication between drones was performed in an ad-hoc manner and managed by a central ground station within communication range of the drones. This arrangement restricts the deployment area of the drone network to the maximum communication range of the ground station. In disclosed embodiments, drones are connected to the Internet and thus there are fewer restrictions with respect to the communication range of the drones. Still the Internet has some challenges. For example, the communication quality may be an issue as Internet connectivity may not be stable. Issues regarding Internet connectivity with drones are addressed in disclosed embodiments. Regarding control of drones, wireless drone systems typically adopt point-to-point communication models with a ground station. This restricts the scalability of such systems and limits them to be used for managing a single drone. For example, presently commercial drones like 3DR Solo drone, Dji Phantom, Erle Copter, etc. use the MAVLink communication protocol to interact with a ground station (e.g. QGroundControl, DroidPlanner, Tower) through a UDP, TCP, Bluetooth or USB network interfaces. See The MAVLINK Protocol, [Online]. Available: //qgroundcontrol.org/mavlink/start, incorporated herein by reference in its entirety. These ground stations are standalone systems and allow control of only a single drone by a single user. Other ground stations like Universal Ground Control Station (UgCS) provide multiple drones' support. However, they share the limitation with other ground stations of being standalone applications with no option for sharing among multiple users nor promoting collaboration missions among drones. In contrast, an objective of disclosed embodiments is to control multiple drones by multiple users by providing seamless access to drones' resources through cloud services, and dynamically manage the mission of drones.

In addition, disclosed embodiments provide the opportunity for developers to seamlessly develop their own cloud applications using disclosed APIs for high-level languages such as Java, Python and Web programming languages, through web services technologies. The disclosed APIs also provide new alternatives for educational framework on drones programming and applications development.

Furthermore, an object of disclosed embodiments is to use the cloud as a "remote brain" for the UAVs by providing remote computation and storage services. See E. Guizzo, Robots with their heads in the clouds, IEEE Spectr. 48 (3)(2011) 16-18, doi: 10.1109/MSPEC.2011.5719709, incorporated herein by reference in its entirety. The UAV simply acts as a mobile sensor node and/or sink that collects data from points of interest and transfers it to the cloud, which, in turn, stores, processes and provides interpretation for the collected raw data. In addition, the services provided by the cloud allow clients to connect, coordinate missions, maintain global knowledge of UAVs, as well as initiate commands to the UAVs for future missions.

Disclosed embodiments leverage the use of cloud computing paradigm to address all the aforementioned requirements. Disclosed embodiments offer two main benefits: (1) Virtualization: the cloud infrastructure includes virtualized UAV resources with abstract interfaces. The cloud infrastructure provides a mapping of the physical UAVs to virtual UAVs, so that end-users interact with virtual UAVs instead of the physical UAVs. The cloud infrastructure enables the concept of the Internet-of-Drones (IoD) as a specific case of the IoT where the UAVs represent the things connected to the Internet through abstract interfaces. (2) Computation offloading: the cloud plays the role of a remote brain for the UAVs by providing storage and computation services. See Guizzo. This approach overcomes the computing and storage resources' limitations of the UAVs, as intensive computation is not required to be performed on-board, but rather may be offloaded to the cloud. As such, the UAV may act as a mobile sensor and actuator decoupled from heavy computations. These two benefits are illustrated in disclosed embodiments. In summary, the main contributions of the disclosed embodiments are four-folded.

First, disclosed embodiments enable an aspect of Internet-of-Drones (IoD), its requirements, security considerations, challenges, and importance.

Second, disclosed embodiments include a cloud-based management of drones connected through the Internet with cloud integration.

Third, disclosed embodiments include a software architecture.

Fourth, disclosed embodiments include use cases and applications to control drones over the Internet.

The Internet of Drones (IoD) can be defined as an architecture for providing control and access between drones and users over the Internet. In fact, Drones are increasingly becoming commodity items widely available off the shelf, thus allowing their use by any user to fly various missions using multiple drones in a controlled airspace. Whereas technology is helping the miniaturization of a UAV's onboard components including processors, sensors, storage as well as improving the battery life, the limitations of these components still hinder the performance and lower the expectations. IoD applies Internet of Things, and coupled with cloud robotics technologies allows remote access and control of drones as well as the seamlessly scalable computation off-loading and remote storage capabilities of the Cloud.

There are various challenges associated with the implementation of IoD. Reliable point-to-point communications, mission control, seamless wireless connectivity, effective utilization of onboard resources are just a few of the concerns. Furthermore, Quality of Service (QoS) is a crucial issue that must be considered in the design of IoD. Security is also an important challenge as access to drones' resources must be authenticated and secured. In addition, the IoD system must be immune to attacks, such as drone impersonation, flooding, and sniffing. Another important aspect is to hide the underlying technical information from the user which is possible by using a service-oriented approach, typically implementing SOAP or REST Web services. See C. Pautasso, O. Zimmermann, F. Leymann, Restful web services vs. "big" web services: Making the right architectural decision, in: Proceedings of the 17th International World Wide Web Conference (WWW 2008), ACM, New York, N.Y., USA, 2008, pp. 805-814, doi: 10.1145/1367497.1367606, incorporated herein by reference in its entirety. Also, the need for users to be technically savvy in order to program or develop missions may be alleviated by a web services based system that would provide easy access to onboard resources through various APIs.

Disclosed embodiments provide a solution to seamlessly accessing drones resources over the Internet and control their mission. Disclosed embodiments provide a platform allowing users to access and control multiple drones over the Internet. Using a web based interface, a user can deploy a virtual drone with specific tasks including, (1) assigning a mission with a planned path over multiple waypoints, (2) allocating tasks at various waypoints including but not limited to capturing images, and weather sensing information, (3) transmitting captured data to the cloud for further processing in addition to (4) continuously updating the location and status of the drone to the user. At the time of mission initiation, each virtual drone is mapped to a physical drone available in a warehouse, which connects to Cloud Services and performs the associated tasks. Using the Cloud Services, several virtual missions can be planned ahead of time for a limited number of physical drones available. The IoD provides a platform for various applications in security, surveillance, disaster recovery, and promises efficient use of limited resources available.

The main objectives of an IoD management system, include:
to provide seamless access to and real-time control and monitoring of drones for end-users,
to offload intensive computations from drones to the cloud,
to schedule the missions of multiple drones dynamically,
to provide a collaborative framework for multiple drones,
and to provide cloud-based programming APIs for developers to develop drones' applications through the cloud.

The following illustrative scenario is provided to aid in describing disclosed embodiments. A team of multiple autonomous UAVs are deployed in an outdoor environment in their depot waiting for the execution of certain missions. A user accesses the disclosed cloud layer to define a mission (e.g. visiting a set of waypoints) and requests its execution. The user may either select one or more virtual UAVs from the list of available UAVs registered in the cloud, or may send a request to the cloud layer to auto-select one or more UAVs to execute the mission. Each virtual UAV is mapped to a physical UAV by the cloud using a service-oriented approach, typically implementing SOAP or REST Web services See Pautasso et al. Once the mission request is received, the selected UAVs execute the mission and report in real-time the data of interest to the cloud layer, which in turn will store, process and forward synthesized results to the user.

Another use case is when the user selects locations of interest to visit on the map and sends them to the drone. By default, the drone will execute the mission by visiting the locations according to their sequence number. However, this might not be the optimal way to visit the waypoint. The problem becomes even more complex when there is a need to optimally assign multiple locations to multiple drones. By default, the drone will execute the mission by visiting the locations according to their sequence number. The sequence number is typically defined by the order of the waypoint selection of the end-user. However, this order might not be optimal in terms of energy, time or traveled distance. This problem can be seen as the traveling salesman problem (TSP), where an optimal tour must be determined to optimize the cost of the mission. This problem is known to be NP-Hard and the computational time grows exponentially with the number of target locations. Definitely, the execution of the TSP algorithm on the drone is not efficient, as low-cost drones have limited computation capabilities and thus cannot execute such time-consuming algorithms. In addition, low-cost drones operate on batteries, thus, the execution of such resource-demanding and power-consuming algorithms will quickly consume available energy. The problem becomes even more complex when there is a need to optimally assign multiple locations to multiple drones, which requires computation of a multiple traveling salesman problem (MTSP) algorithm that is even harder than the TSP.

So, the disclosed cloud-based system offloads such intensive computation from the drone to optimize the mission execution, and thus extending the energy lifetime of the drone.

Another use case is a mission being executed by multiple drones, where one or more drones fail to arrive at their waypoint locations of interest. In this case, it is important to deal with such a fault and to make a recovery plan. Using the disclosed cloud-based management system, it is possible to detect these kinds of faults and to act accordingly by re-scheduling the missions of the drones in real-time to cover the waypoints not visited by the faulty drones. The same situation of re-scheduling happens when a new event occurs and requires the visiting of new locations of interest by the drone. Using the disclosed cloud-based management system has the benefit to promote a collaborative environment between the drones through the cloud system so that to dynamically update their missions in real-time based on current status of the system.

Disclosed embodiments scale with increased number of UAVs generating increasingly large sets of data. The use of cloud computing infrastructure will allow scaling by adopting an elastic computing model. Additionally, the correct operation of the integrated cloud-UAV system does not only depend on guaranteeing message delivery, but equivalently important is the delivery of messages within bounded end-to-end time frames. Excessive delays or jitters on the message may result in delaying decision making and subsequent actions on critical events, adversely affecting the QoS. Thus, QoS is a crucial issue that must be considered in the design of the integrated cloud-UAV system.

FIG. 1 is a diagram for the architecture for the integrated system. The architecture includes four types of components, including UAVs 105, one or more ground control stations 103, one or more user devices 107, and a cloud network 101. The one or more UAVs 105 may collect and send a data signal to a ground control station (GCS) 103. The GCS 103 may receive data signals from UAVs 105 and send out command and control data to UAVs 105. The user devices 107 may be provided with access to the parameters and data of the UAVs 105. The cloud network 101 facilitates data exchange between UAVs 105, ground control station 103, and user devices 107 as nodes that store and share the cloud.

A UAV 105 is a pilotless aerial vehicle which can be controlled autonomously by onboard computers or be controlled in a range of levels including remotely controlled by a pilot at the GCS 103 to partially remotely controlled by way of an initial flight plan. UAVs 105 may transmit data signals collected from various onboard sensors mounted on the UAV (current altitude, speed, map position, weather, wind speed) and flight status information (current mission status, energy) to GCS 105.

The GCS 103 is responsible for receiving data signals from UAVs 105, sending out command and control data to monitor and control each UAV 105 in flight, uploading new mission commands and setting parameters.

The user devices 107 may be third-party devices that have access to the parameters and data of the UAVs 105 and GCS 103 for various useful purposes.

In some embodiments, the cloud network 101 facilitates a distributed immutable database of actions performed by user devices 107, data collected from UAVs 105 and commands from GCS 103. The recorded transactions are shared between the user devices 107, the UAVs 105 and the ground control station 103 as nodes in the network 101. In the disclosed architecture, the user devices 107, UAVs 105, and GCS 103 act as nodes, storing the whole cloud and participating in a consensus protocol to verify blocks. The cloud network 101 is composed of cryptographically linked list of blocks created by the nodes. Each block may contain one or more transactions. A block is identified by its cryptographic hash and it references the hash of the preceding block.

Figure 2:
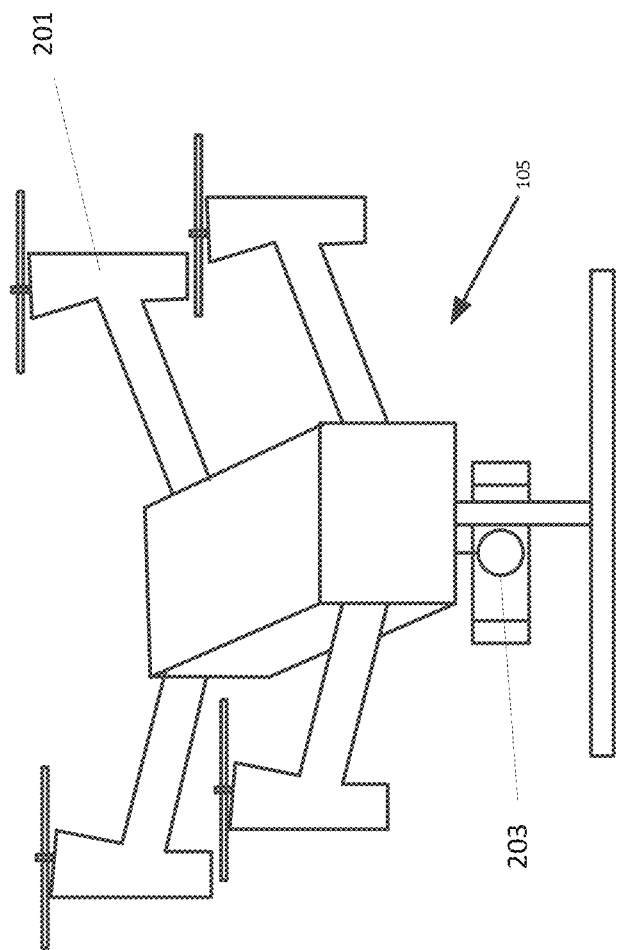
FIG. 2 illustrates an exemplary UAV.

FIG. 2 illustrates a non-limiting example of a UAV. A common type of UAV 105 is a quadcopter drone, a multi-rotor helicopter having four rotors 201 (vertically oriented propellers). A quadcopter drone may include a stabilized camera 203. As will be discussed later, a UAV includes internal communications and control equipment.

Figure 3:
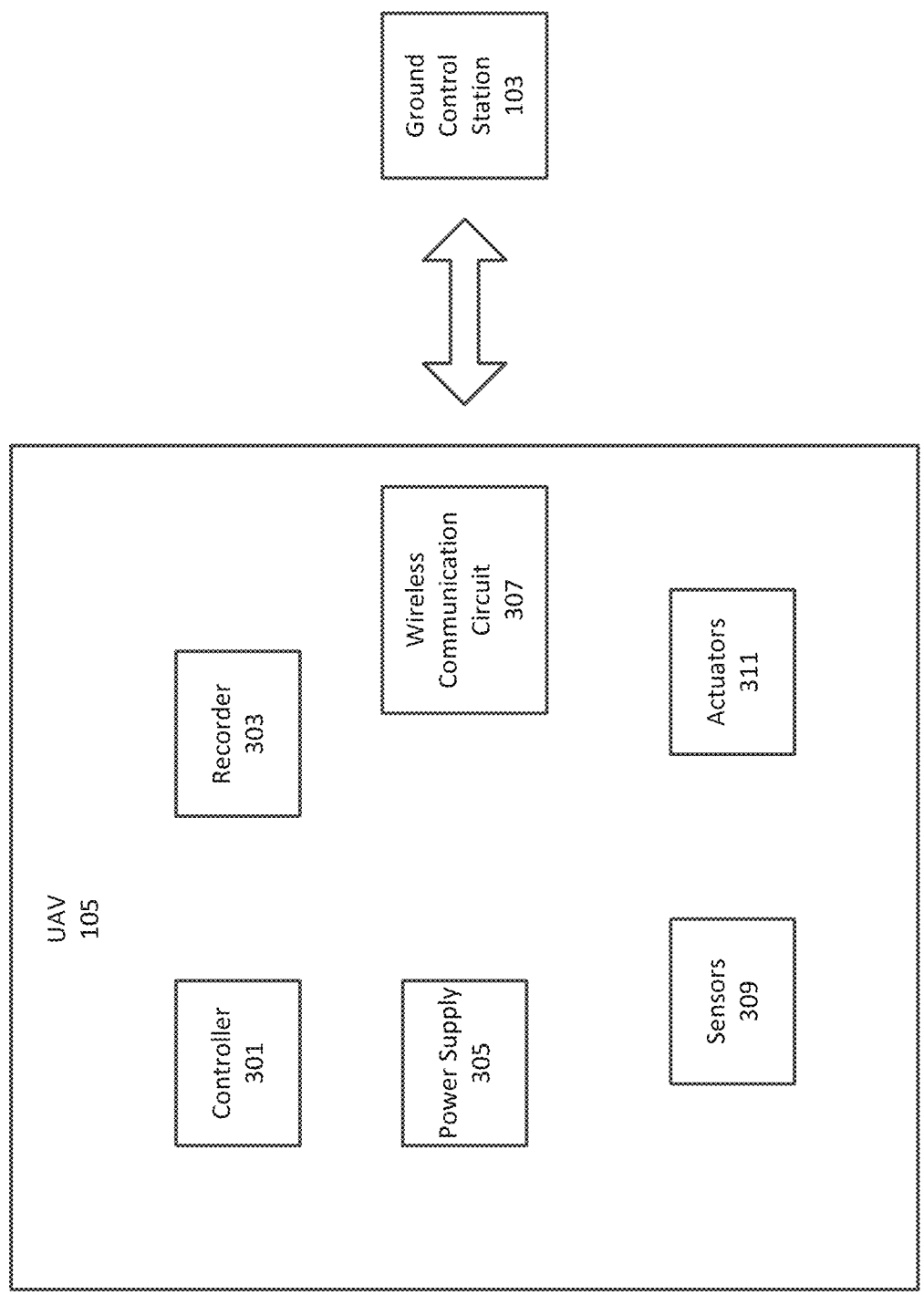
FIG. 3 is a block diagram of exemplary internal UAV communications and control components in communication with a ground control station.

FIG. 3 is a block diagram of exemplary internal UAV communications and control components in communication with a ground control station. A UAV 105 may be provided with various levels of control ranging from remote control by the ground control station 103 to fully autonomous control by a controller 301 based on an initial flight plan provided by the ground control station 103. Communication with the ground control station 103 may be through a wireless communication circuit 307. The wireless communication circuit 307 may be configured with a radio for remote control, and may also be configured with one or more of cellular communications circuitry, WiFi and Bluetooth interfaces for Internet communications, as well as a global positioning system (GPS). The UAV 105 includes a power supply 305, and may include at least one sensor 309 and at least one actuator 311. The sensor 309 may be part of an inertial measurement unit (IMU) that includes an accelerometer, a gyroscope, and a magnetometer which may be used to estimate acceleration and speed of the UAV 105. The actuator 311 may include speed controllers that independently control speed of each rotor. The UAV may also include a recorder 303.

Figure 4:
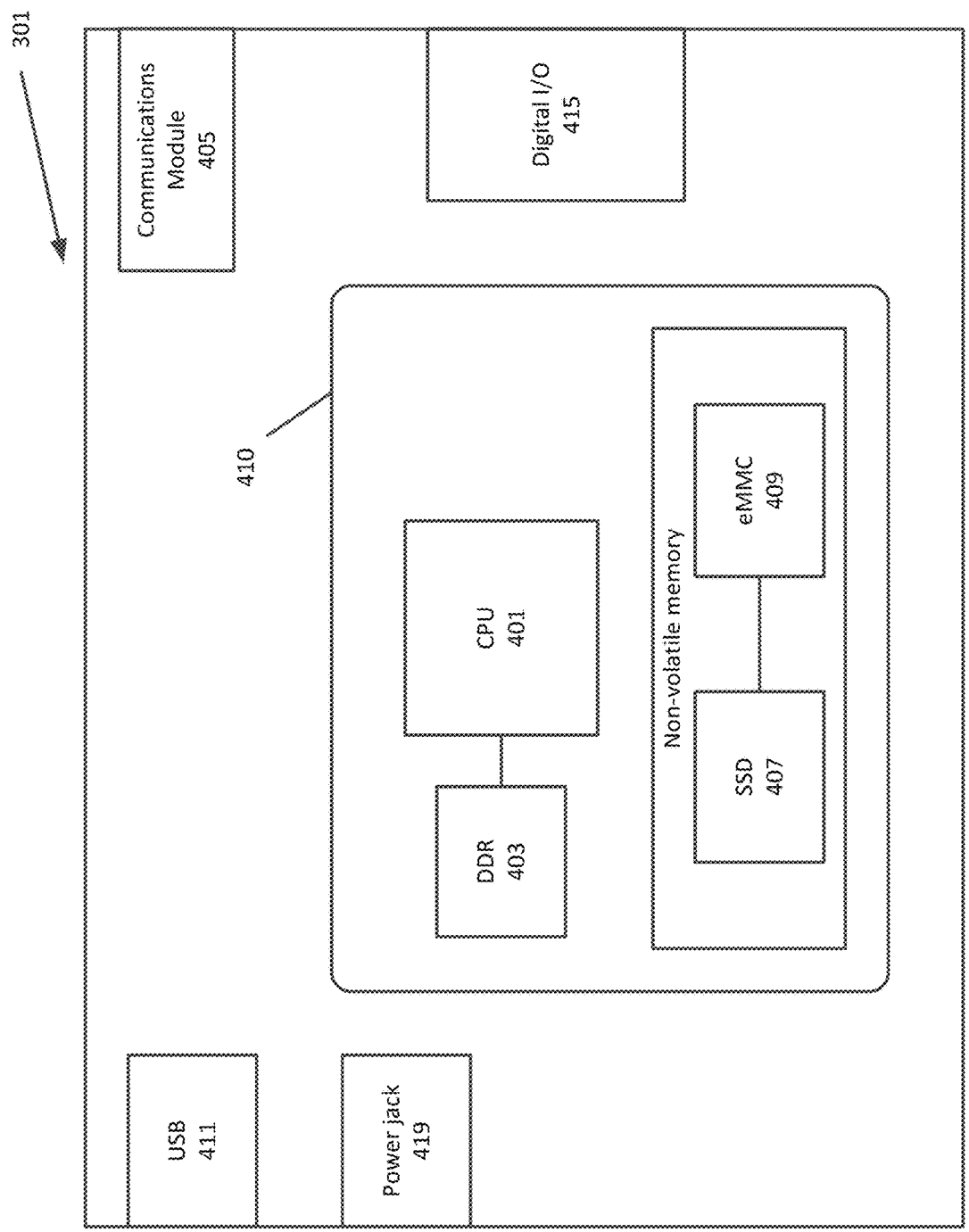
FIG. 4 is a block diagram of an exemplary controller for an UAV.

FIG. 4 is a block diagram of an exemplary controller for an UAV. The computer-based controller 301 may be based on a microcontroller or microprocessor. A microcontroller or microprocessor may contain one or more processor cores (CPUs) along with memory (volatile and non-volatile) and programmable input/output peripherals. Program memory in the form of flash, ROM, EPROM, or EEPROM is often included on chip, as well as a secondary RAM for data storage. In one embodiment, the computer-based system 301 is single board computer. The board includes a communications module 405, digital I/O pins 415, a USB connection 411, and a power jack 419. Variations can include the number of pins, whether or not the board includes communication ports or a reset button.

The microcontroller or microprocessor may range from a 8-bit RISC-based microcontroller to a multiple core 64-bit microprocessor. The microcontroller may be configured with flash memory 403, SRAM 407, general purpose I/O lines, general purpose registers, a real time counter, flexible timer/counters, a A/D converter, and a JTAG interface for on-chip debugging. The microcontroller may be a single high throughput SOC that operates at a low voltage. Although the description is of a particular microcontroller product, it should be understood that other microcontrollers may be used. Microcontrollers vary based on the number of processing cores, size of non-volatile memory, the size of data memory, as well as whether or not it includes an A/D converter or D/A converter.

Figure 5:
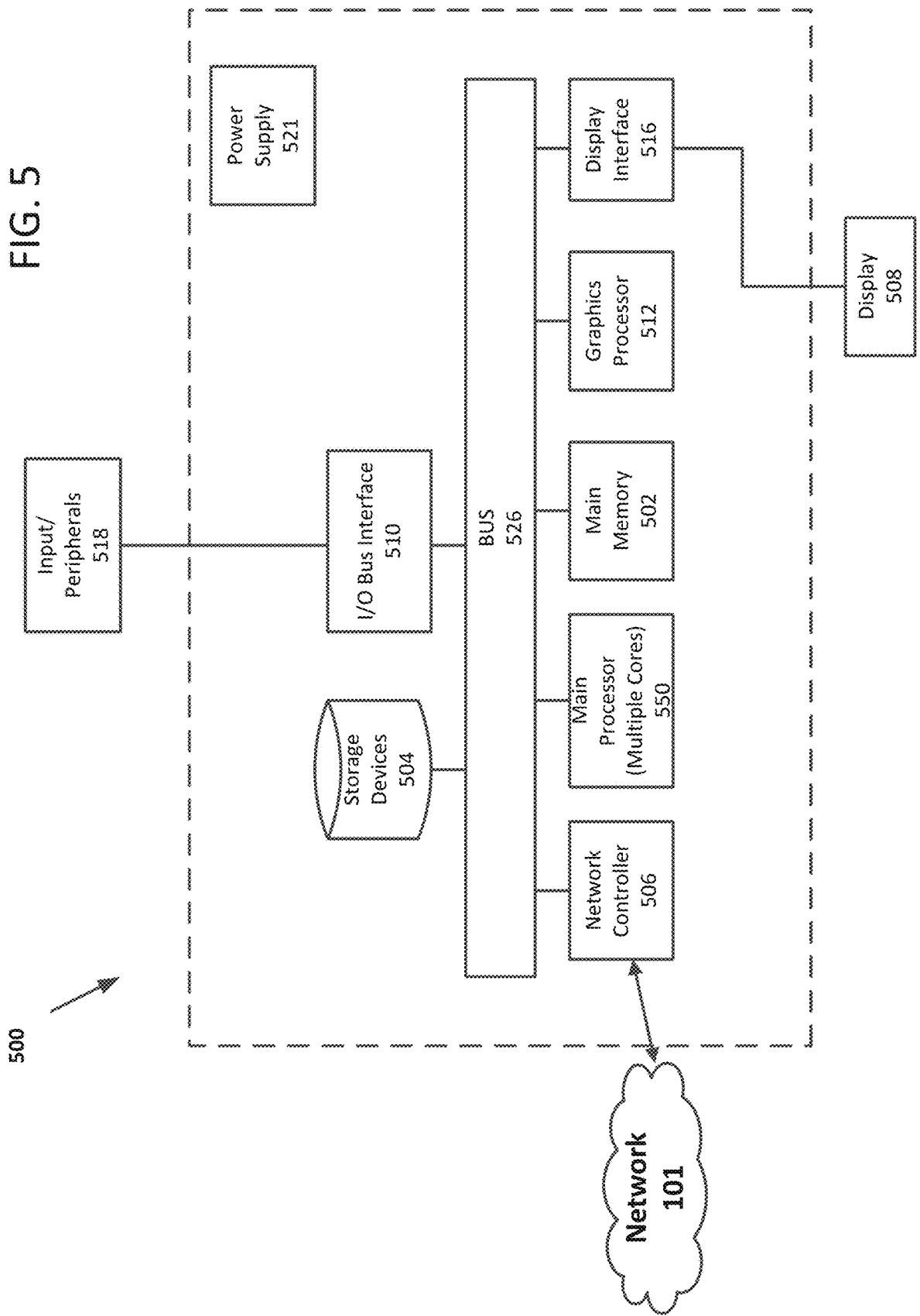
FIG. 5 is a block diagram of an exemplary server in a cloud network.

FIG. 5 is a block diagram of an exemplary server in a cloud network. The server runs a server operating system, for example Windows Server, a version of Unix OS, or Mac OS Server. The computer system 500 may include circuitry in the form of one or more processing cores 550 and a graphics processor 512. The graphics processor 512 may perform many of the mathematical operations. The computer system 500 includes additional circuitry that is implemented as main memory 502, typically random access memory RAM, which contains the software being executed by the processing cores 550 and graphics processor 512, as well as a non-volatile storage device 504 for storing data and the software programs. Several interfaces for interacting with the computer system 500 may be provided, including an I/O Bus Interface 510, Input/Peripherals 518 such as a keyboard, touch pad, mouse, Display Interface 516 and one or more Displays 508, and a Network Controller 506 to enable wired or wireless communication through a network 101. The interfaces, memory and processors may communicate over the system bus 526. The computer system 500 includes a power supply 521, which may be a redundant power supply.

Figure 6:
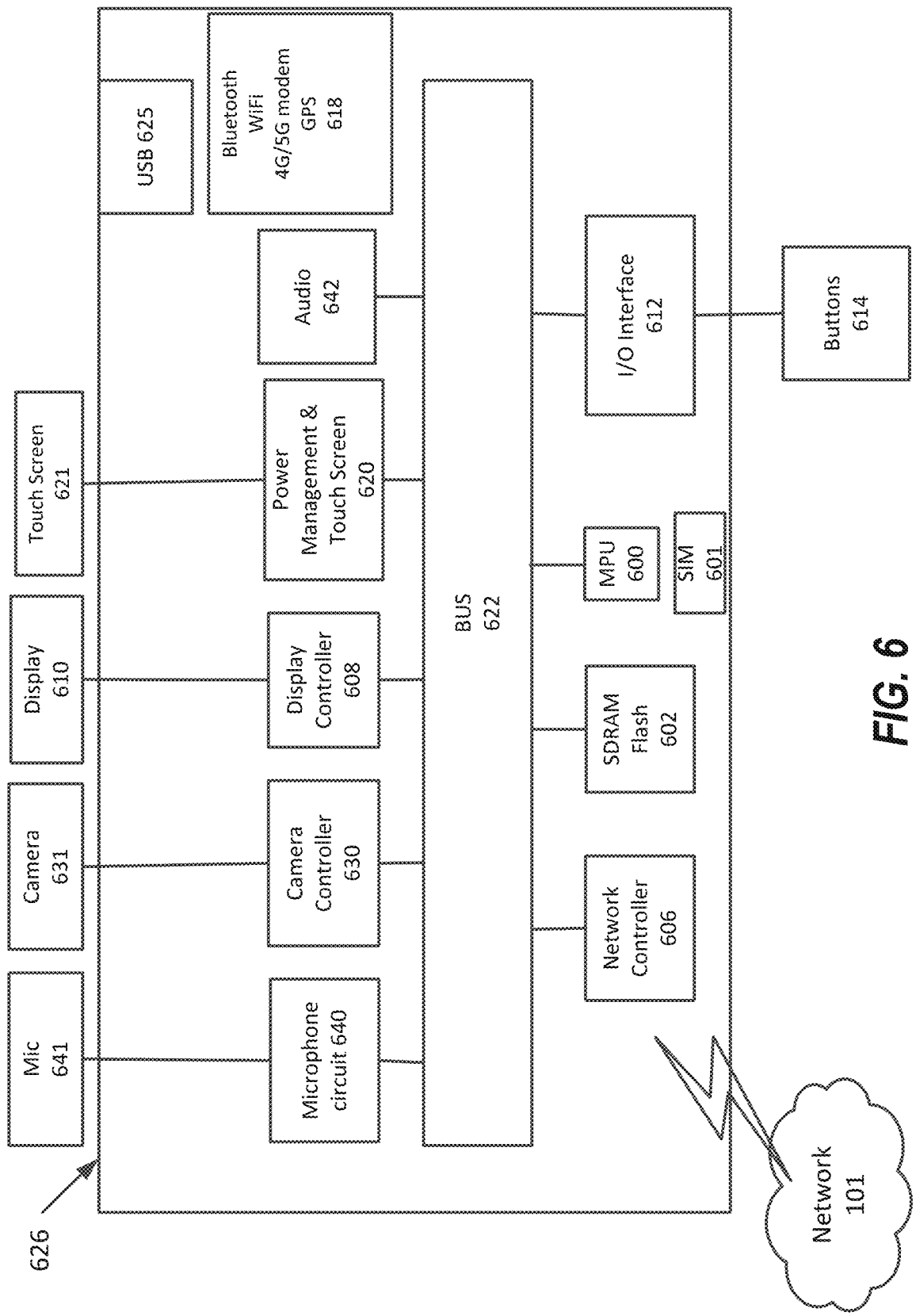
FIG. 6 is a block diagram of an exemplary user mobile device.

FIG. 6 is a block diagram of an exemplary user mobile device. In one implementation, the functions and processes of the mobile device 107 may be implemented by processing circuitry 626. A processing circuitry includes a programmed processor. A processing circuitry may also include devices such as an application specific integrated circuit (ASIC) and conventional circuit components arranged to perform the recited functions.

Next, a hardware description of the processing circuitry 626 according to exemplary embodiments is described with reference to FIG. 6. In FIG. 6, the processing circuitry 626 includes a Mobile Processing Unit (MPU) 600 which performs the processes described herein. The process data and instructions may be stored in memory 602. These processes and instructions may also be stored on a portable storage medium or may be stored remotely. The processing circuit 626 may have a replaceable Subscriber Identity Module (SIM) 601 that contains information that is unique to the network service of the mobile device 130.

Further, disclosed embodiments are not limited by the form of the computer-readable media on which the instructions of the inventive process are stored. For example, the instructions may be stored in FLASH memory, Secure Digital Random Access Memory (SDRAM), Random Access Memory (RAM), Read Only Memory (ROM), Programmable Read-Only Memory (PROM), Erasable Programmable Read-Only Memory (EPROM), Electrically Erasable Programmable Read Only Memory (EEPROM), solid-state hard disk or any other information processing device with which the processing circuit 626 communicates, such as a server or computer.

Further, disclosed embodiments may be provided as a utility application, background daemon, or component of an operating system, or combination thereof, executing in conjunction with MPU 600 and a mobile operating system such as Android, Microsoft® Windows® 10 Mobile, Apple iOS® and other systems known to those skilled in the art.

The processing circuitry 626 may be realized by various circuitry elements, known to those skilled in the art. For example, MPU 600 may be a Qualcomm mobile processor, a Nvidia mobile processor, a Atom® processor from Intel Corporation of America, a Samsung mobile processor, or a Apple A7 mobile processor, or may be other processor types that would be recognized by one of ordinary skill in the art. Alternatively, the MPU 600 may be implemented on an Field-Programmable Gate Array (FPGA), Application Specific Integrated Circuit (ASIC), Programmable Logic Device (PLD) or using discrete logic circuits, as one of ordinary skill in the art would recognize. Further, MPU 600 may be implemented as multiple processors cooperatively working in parallel to perform the instructions of the inventive processes described above.

The processing circuitry 626 in FIG. 6 also includes a network controller 606, such as an Intel Ethernet PRO network interface card from Intel Corporation of America, for interfacing with network 101. As can be appreciated, the network 101 can be a public network, such as the Internet, or a private network such as LAN or WAN network, or any combination thereof and can also include PSTN or ISDN sub-networks. The processing circuitry may include various types of communications processors for wireless communications including 3G, 4G and 5G wireless modems, WiFi®, Bluetooth®, GPS, or any other wireless form of communication that is known.

The processing circuitry 626 includes a Universal Serial Bus (USB) controller 625 which may be managed by the MPU 600.

The processing circuitry 626 further includes a display controller 608, such as a NVIDIA® GeForce® GTX or Quadro® graphics adaptor from NVIDIA Corporation of America for interfacing with display 610. An I/O interface 612 interfaces with buttons 614, such as for volume control. In addition to the I/O interface 612 and the display 610, the processing circuit 626 may further include a microphone 641 and one or more cameras 631. The microphone 641 may have associated circuitry 640 for processing the sound into digital signals. Similarly, the camera 631 may include a camera controller 630 for controlling image capture operation of the camera 631. In an exemplary aspect, the camera 631 may include a Charge Coupled Device (CCD). The processing circuit 626 may include an audio circuit 642 for generating sound output signals, and may include an optional sound output port.

The power management and touch screen controller 620 manages power used by the processing circuit 626 and touch control. The communication bus 622, which may be an Industry Standard Architecture (ISA), Extended Industry Standard Architecture (EISA), Video Electronics Standards Association (VESA), Peripheral Component Interface (PCI), or similar, for interconnecting all of the components of the processing circuit 626. A description of the general features and functionality of the display 610, buttons 614, as well as the display controller 608, power management controller 620, network controller 606, and I/O interface 612 is omitted herein for brevity as these features are known.

Figure 7:
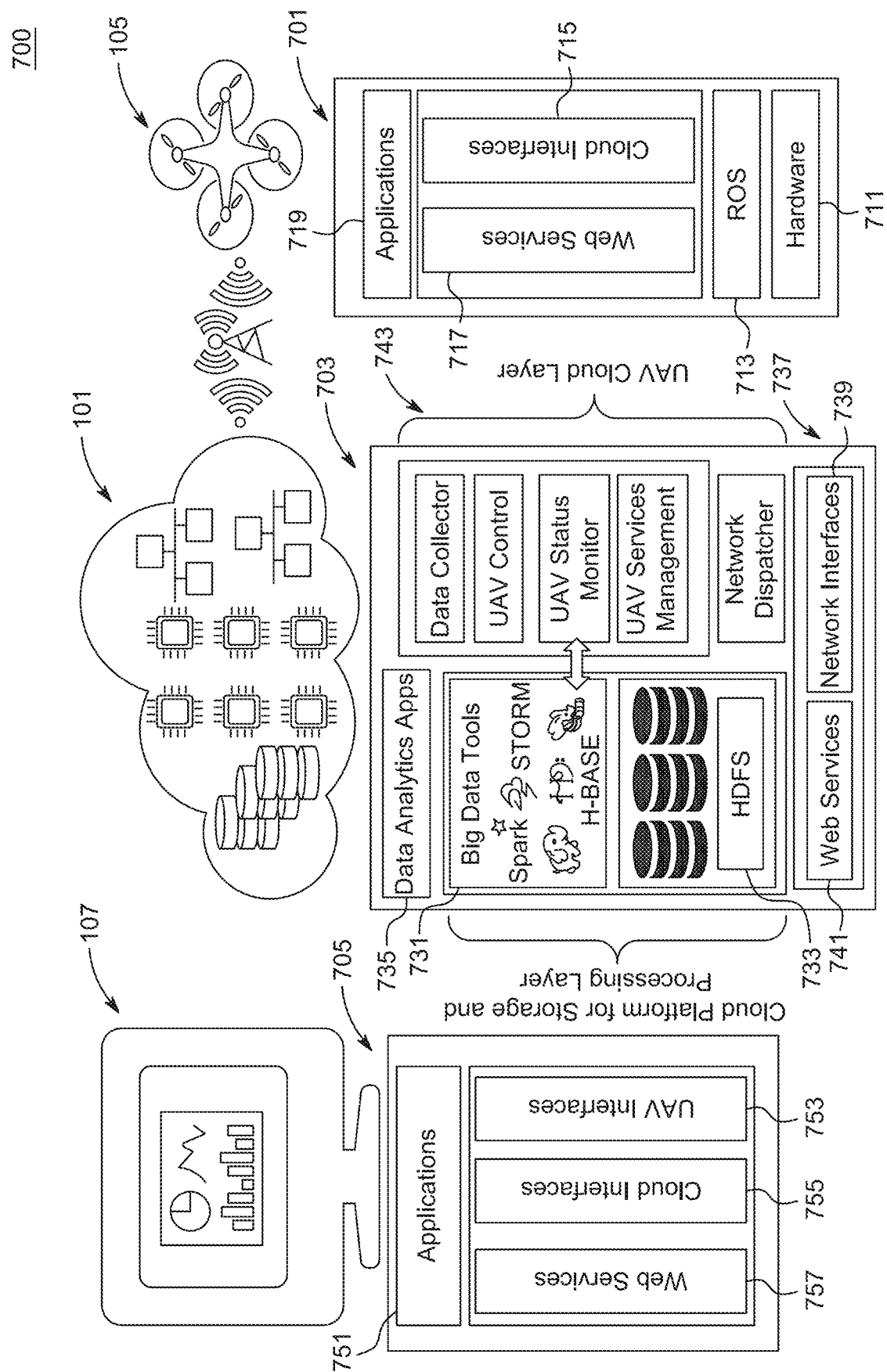
FIG. 7 is a block diagram of a system architecture in accordance with an exemplary aspect of the disclosure.

FIG. 7 is a block diagram of a system architecture in accordance with an exemplary aspect of the disclosure.

The UAV Layer: The UAV layer 701, 743 represents a set of resources exposed as services to the end-user. The UAV 701 has several hierarchical layers. On top of the hardware 711, ROS 713 and MAVLink 715, 717 provide both two different layers as the first layer that hides hardware resources (i.e. sensors 309 and actuators 311). Robot Operating System (ROS) 713 is a middleware to develop robotics applications and is modular software for robots. In disclosed embodiments, ROS 713 has been adopted for UAVs. In fact, ROS presents different abstractions to hardware, network and operating system such as navigation, motion planning, low-level device control, and message passing. On the other hand, MAVLink 715, 717 is a communication protocol built over different transport protocols (i.e. UDP, TCP, Telemetry, USB) that allows the exchange of pre-defined messages between the drones and ground stations, which provide a high-level interface for applications developers to control and monitor drones without having to interact with hardware. ROS 713 and MAVLink 715, 717 allow software developers to focus more on the high-level development of applications 719 without having to deal with hardware issues.

Cloud Services Layer 703: Cloud Services Layer 703 includes three sets of components: (1) Storage components 731, 733: This set of components provides storage for streams of data originated from UAVs and captured by this layer. Each UAVs environment variables, localization parameters, mission information, and transmitted data streams including sensor data and images with time-stamps are stored in the cloud either in regular SQL database or in a distributed file system 733 (i.e. HDFS, NoSQL database such as HBase), depending on the application's requirements. Storage in distributed file systems 733 helps to perform large-scale batch processing on stored data using tools 731 like Hadoop Map/Reduce.

There are two types of data processing on cloud computing infrastructure 703: (i.) Real-time stream processing: the cloud processes incoming streams of data for detecting possible critical events or threats that require immediate action or performs dynamic computation in a distributed environment. Examples of real-time stream processing could include processing sample images received from the UAV to detect a possible threat (i.e. intruder into an unauthorized area) and/or processing sensor data (e.g. high temperature value in case of fire). Another possible real-time application processing might be required when new events are detected and require the dynamic re-scheduling of drones' missions to ensure the optimality of the missions' executions after considering the new events. (ii.) Batch processing: Incoming data is stored in the HDFS distributed file system 733 for increased reliability as well as post-processing using a distributed parallel computing approach. Batch processing 735 can be used to look for particular events into a log file, for example, how many intruders detected in an unauthorized area over a certain period of time. The cloud services layer 703 implements a cluster of compute nodes running Hadoop HDFS 733. Data may be stored in various tables using NoSQL in Hbase 731. (2) Computation components: Various computation intensive algorithms 735 may be deployed in the cloud. Image processing libraries process stored data available in HBase to detect possible event. For example, the cloud services layer 703 may include image processing procedures for perform object recognition using a video that is streamed from a UAV. In addition, Map/Reduce jobs running on the Yarn cluster allow applications to run in parallel reducing the processing time, therefore improving performance. Additionally, Data Analytics algorithms 735 can be executed on the stored set of large scale data 731, 733. (3) Interface components 737: three sets of interfaces are included as part of this component. (i.) Network interfaces 739 implement network sockets and Websockets interface on the server side. These provide listening to JSON serialized messages sent from UAVs. In particular, Websockets are the most appropriate protocol to reliably handle streaming applications. In the context of drone management, MAVLink messages are received from the drones through network sockets (UDP or TCP), and then forwarded to the client application through Websockets. The reason behind this strategy is that Websockets are supported by all programming languages (e.g. Java, Python, C++) including Web technologies. The use of UDP or TCP sockets for streaming to the client will induce more restrictions to the development of Web client applications. (ii.) The Web Services interfaces 741 allow clients to control the missions of the drones and their parameters. Both SOAP and REST Web Services are used to provide the end-users and client applications different alternative to control and monitor the drones through invocation of Web Services. While network interfaces 739 are used to mostly handle continuous streams, Web Services 741 are used for sending control commands to the drones and getting information from the cloud.

Client Layer: The client layer 705 provides interfaces for both end-users and drones' applications developers. For end-users, the client layer 705 runs client side Web applications 751, which provide interfaces 755, 753 to the cloud services layer as well as the UAV layer. Users may be provided access for registering multiple UAVs, defining and modifying mission parameters and decision making based on data analysis provided by the cloud. The applications 751 allow users to monitor and control the UAVs and their missions remotely. Front-end interfaces may provide the functionalities to the user to connect/disconnect, use available physical UAVs and their services, configure and control a mission and monitor the parameters of the UAV. For developers, the client layer 705 provides several APIs 757 for different programming languages to easily develop drones' applications and interact with their drones.

In a disclosed software architecture, a modular component-based software promoting is adapted, where components are loosely coupled and each component implements a specific behavior of the application. In this architecture, agent refers to a drone, user or a cloud.

Figure 8:
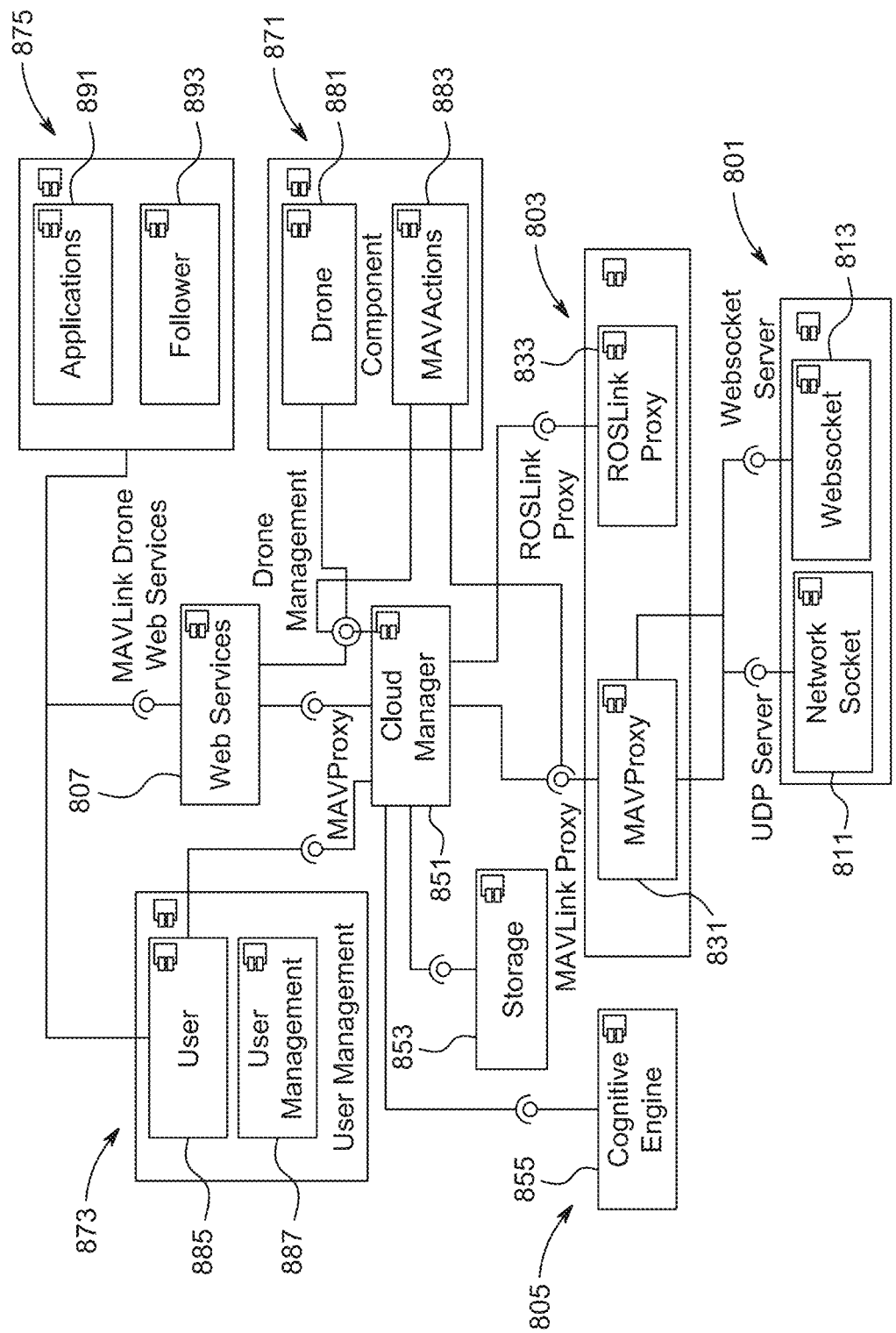
FIG. 8 is a block diagram of system components in accordance with an exemplary aspect of the disclosure.

FIG. 8 is a block diagram of system components in accordance with an exemplary aspect of the disclosure. The software system is decomposed into four main subsystems (or layers), each of which contains a set of components. These subsystems are:

Communication: The communication subsystem 801 represents the basic building block for network communications between the drones, users and the cloud. There are two main components, namely (i.) Network sockets 811 and (ii.) Websockets 813. On the one hand, Network sockets 811 allow agents (drones, users, and cloud) to exchange JSON serialized messages between each other through the network interface using sockets. The use of JSON message format is beneficial for interaction between heterogeneous systems as it is platform-independent and less verbose than XML. On the other hand, Websockets 813 interfaces are used to handle data streaming between the cloud 101 and the user applications 107. Websockets technology is used because it is supported by different programming languages including Web technologies.

Proxy: The proxy layer 803 acts on top of the communication layer and incorporates all the protocol-related operations including message parsing, dispatching, and processing. This layer supports two protocols. The first protocol is the MAVLink communication protocol, which is the de-facto standard for the communication between ground stations and drones. The MAVLink protocol is based on binary serialization of messages and operates on different transport protocols, namely, UDP, TCP and serial. The second protocol is the ROSLink protocol, which is a proprietary protocol that has been developed to ensure interaction between a robot and a ground or control station. ROSLink is very much inspired from the MAVLink protocol in the sense that it implements a client in the robot that keeps sending JSON serialized messages to the ground station.

Cloud: The cloud layer 805 is responsible for managing all the computing, storage and networking resources of the cloud infrastructure. It is composed of four components, namely (i.) Cloud Manager 851, (ii.) Storage 853, (iii.) Web Services 807 components and (iv.) Cognitive Engine 855. The central component of the cloud layer 805 is the Cloud Manager 851 component, which orchestrates all the processes in the could infrastructure and links all other components together. It uses the interfaces provided by MAVProxy 831 and ROSLinkProxy 833 components, in addition to the storage component 853. On the other hand, it provides interfaces to the Drone 871 and Users 873 components, so that they do have access to MAVProxy 831, ROSLinkProxy 833 and Storage 853 components. The main role of the Storage 853 component is to provide interfaces to store data in different storage media including SQL/NoSQL databases and distributed file storage, i.e. HDFS. Different types of data need to be stored, retrieved and accessed. For example, SQL databases may be used to store information about users, and their credentials, or also information about drones and their missions. In some embodiments, the information about the drones is global knowledge of all drones that is used to perform operations for Unmanned Aircraft System Traffic Management (UTM). The Unmanned Traffic Management operations are performed in the cloud manager 851 and include coordination of the mission of multiple drones in a manner that prevents collision and performs route allocation for the mission. NoSQL databases (e.g. MongoDB) are used for more unstructured data such as data collected from the drones' sensors for further analysis. In some embodiments, data collected from drones includes video data streamed from a drone. The cloud manager 851 may perform object recognition using the streamed video data. In some embodiments, the cloud manager 851 may manage the mission of drones including performing policy enforcement on drones. In one embodiment, a policy may include geofencing. The cloud manager 851 may perform dynamic geofencing based on changes in the deployed environment of the drones in order to ensure safety of operations performed by the drones. Geofencing may be implemented as a geofence for each drone, where the geofence is a virtual perimeter in which the drone will be controlled to stay within for a mission. The geofencing may use the GPS information signal sent from the physical drone in conjunction with a map of the geographic area stored in a database, such as a NoSQL database. HDFS storage can be used to store data that requires further batch processing using distributed computing techniques, like Map/Reduce.

For example, data related to drones' missions can be dumped from SQL or NoSQL databases to HDFS to process it either with batch processing system like Map/Reduce or real-time processing systems like Storm, and extract useful information for dumped data.

The Cognitive Engine (CE) 855 component aims at performing computations on cloud data to reason, plan and solve problems using artificial intelligence techniques. For example, the CE component may include algorithms for assigning multiple targets locations to multiple drones or to a single drone to optimize their missions. This is known as an instance or the typical traveling salesman problem (TSP). Another example would be to process received images or sensor data from drones using real-time processing systems (e.g. Apache Storm) to detect possible events or threats. As mentioned above, data collected from drones may include video data streamed from a drone. The cognitive Engine 855 may perform object recognition using the streamed video data. In general, the CE component will contain intelligent applications to provide smart functionalities and reasoning.

The Web Services (WS) 807 component is the main interface between the cloud infrastructure and the client applications 873 (i.e. users). It provides platform-independent interfaces to end users and leverages the use of the service-oriented architecture (SOA) paradigm. Both SOAP and REST Web Services are defined. The REST APT was designed to allow accessing cloud public resources through simple HTTP requests. The SOAP API was designed for a more formal and structured service-orientation for remote procedure invocation, which is basically used to send commands to the drone 105 from the client application 107. There have been long discussions about the pros and cons of REST and SOAP Web Services and the reader may refer to Pautasso et al. for more details. In the disclosed architecture, both types of Web Services are provided as interfaces with end-users to give more flexibility to users.

Drone: The Drone subsystem 871 (743 in FIG. 7) contains information related to drones 105 and actions that could be performed on them. The Drone component 881 represents a resource in the cloud infrastructure. This resource is basically accessed by client applications 751 through Web Services 807 (741). In addition, the MAVAction 883 component represents all the MAV-Link protocol actions (UAV Control, Network Dispatcher) that could be executed on the drone 105 including taking-off, landing, waypoint navigation, getting waypoints list, changing operation mode, etc. The Drone component 881 maintains the status of the drone 105 (UAV Status Monitor), which is updated whenever a new MAVLink message is received (Data Collector). In addition, it provides an interface to access and modify the parameters of a drone (UAV Services Management). Note that the cloud manager 851 maintains a list of drones in a map data structure, as mentioned above.

User: The User subsystem 873 contains information about users that access the cloud infrastructure 101. Each user should be registered to the cloud infrastructure to have access to drones based on his profiles and privileges. A user might be able to control a single drone, or multiple drones or all drones based on his privileges. The mapping between drones and users is made through the Cloud Manager 851 during the registration of the user to the system, and based on approval of the cloud administrator. There are different possible strategies of mapping between users and drones, namely: (i.) Single User/Single Drone, where one user is allowed to access and control a single physical drone, (ii.) Single User/Multiple drones, where one user is allowed to access and control multiple physical drones, (iii.) Single User/Virtual Drone(s), where one user is not allowed to control a physical drone, but sends its request to the cloud, which will decide on which drone(s) to execute the mission of the user. Each user should have an access key that allows him to access a certain drone resource over the cloud or to develop applications for a particular drone resource. The access to drone resources on the cloud is given to the users either through SOAP and REST Web Services to execute commands, or through Websockets to receive drones' MAVLink data streams.

The MAVProxy 831 is responsible for (i.) processing MAVLink related messages received from the drones 105, (ii.) dispatching messages to users 107 through the Websockets protocol, (iii.) updating the information of drones objects of the Cloud Manager 851. It is a multi-threaded server that was designed to effectively handle MAVLink data streams and messages. At the reception of a MAVLink message, a new thread will be created to process that individual message and extract related information, depending on the message type.

The ROSLinkProxy 833 has the same functionalities as MAVProxy, but it processes ROSLink messages instead of the MAVLink message.

If the message received is the Heartbeat message for a new drone 105 (first message received from a drone), the MAVProxy 831 adds this drone into the map data structure of drones maintained in the cloud manager 851. In the drones' map structure each drone is identified by a key that is composed of (i.) the IP address of the drone, (ii.) the port number, (iii.) and its system ID. This composite key will make sure that every drone is identified uniquely in the cloud, even in the case that two drones of different users use the same system ID. In fact, the system ID is encoded in 8 bits only which allows a total of 255 different system IDs for drones 105, which limits the scalability of the system, or will induce conflict in recognizing a particular drone using the same system ID of another drone. The use of a composite key that includes the IP address and port number will definitely eliminate this problem. In the case of the composite key, the same drone will have a different key in the drones' map each time it connects as it will likely have a new different IP address and/or port number. If the drone already exists, the MAVProxy 831 updates the drone's attributes and parameters in the drones' list. In fact, MAVLink messages periodically carry information about different drone's attributes including GPS location, heading, battery level, altitude, air speed, ground speed, etc. Thus, every type of MAVLink message will update a particular set of attributes of the corresponding drone of the Cloud Manager 851.

In addition to processing messages, MAVProxy 831 forwards incoming messages received from its network interface to the Websockets interface, which in turn forwards the message to the corresponding client, with which a connection is open. When a client connects onto the Websockets server of the MAVProxy 831, a new session is defined and messages related to the drone of interest will be forwarded to the client through that open session. The use of Websockets is very useful in reliable streaming of MAVLink packets between the MAVProxy 831 and the clients. Not only it provides a unified interface for different programming languages, but also Websockets have the advantage of handling clients' sessions effectively, natively supported in the Websockets protocol.

The Cognitive Engine 855 (CE) embeds the intelligence of the cloud of drones. It is the core component that reasons, plans and solves problems for the drones. The CE is responsible for (i.) performing intelligent mission planning for drones, (ii.) intensive computations on the cloud 101, like image processing, (iii.) real-time monitoring of events, like critical events detections with Apache Storm, (iv.) batch processing and data analytics 735 on logged data.

To perform intelligent mission planning, a dynamic mission planner (DMP) application 735 is integrated as a module in the Cognitive Engine 855. In a non-limiting example, multiple drones may be assigned to multiple target locations (i.e. waypoints) to be visited and then instructed to return to their original locations. This problem of assigning multiple drones to multiple target locations is an NP-Hard problem and is commonly referred to as the multiple depot multiple traveling salesman problem (MD-MTSP) and several approaches have been proposed in the literature to solve it. See A. Koubâa, O. Cheikhrouhou, H. Bennaceur, M. F. Sriti, Y. Javed, A. Ammar, Move and improve: a market-based mechanism for the multiple depot multiple travelling salesmen problem, J. Intell. Rob. Syst. 85 (2)(2017) 307-330, doi: 10.1007/s10846-016-0400-x; and S. Trigui, O. Cheikhrouhou, A. Koubaa, U. Baroudi, H. Youssef, Fl-mtsp: a fuzzy logic approach to solve the multi-objective multiple traveling salesman problem for multi-robot systems, Soft Comput. 21 (24)(2017) 7351-7362, doi: 10.10 07/s00500-016-2279-7, each incorporated herein by reference in their entirety. The Cognitive Engine 855 provides the user with the service that determines the most optimal allocation of waypoints based on his requirement, while implementing one or some of the solving algorithms on the CE component of the cloud. Current mission planners such as QGround-Control, DroidPlanner, Tower and Universal Ground Control Station (UgCS) do not incorporate a similar intelligent functionality.

The Move and Improve approach of Koubaa et al. provides a distributed solution based on a market-based approach. The approach involves, in each step, moving a robot and attempting to improve its solution while communicating with its neighbors. The approach has four phases: an allocation phase, tour construction phase, overlapped targets elimination phase, and a solution improvement phase. In the overlapped targets elimination phase, the overlapping targets are negotiated. The negotiation continues to improve the solution quality over time by exchanging targets that would optimize the overall cost.

Figure 9:
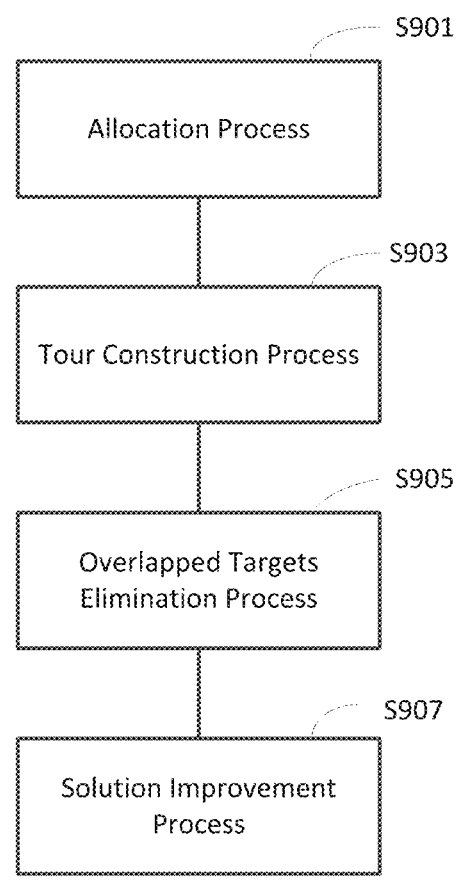
FIG. 9 is a flowchart of the move and improve algorithm performed using in the cognitive engine.
Figure 10A:
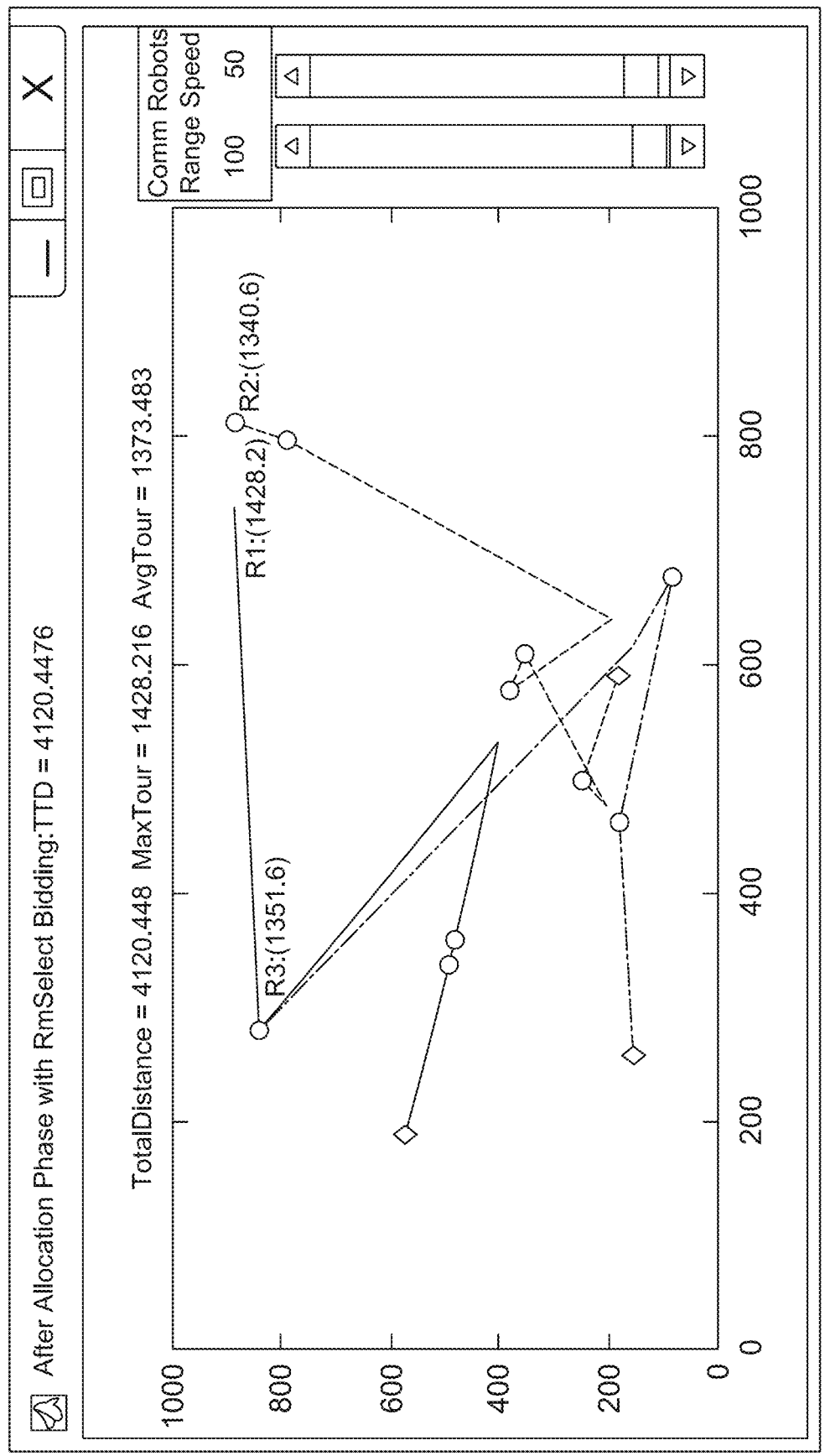
FIGS. 10A, 10B, 10C, 10D are plots showing the processes of the move and improve algorithm for an example with three UAVs.
Figure 10B:
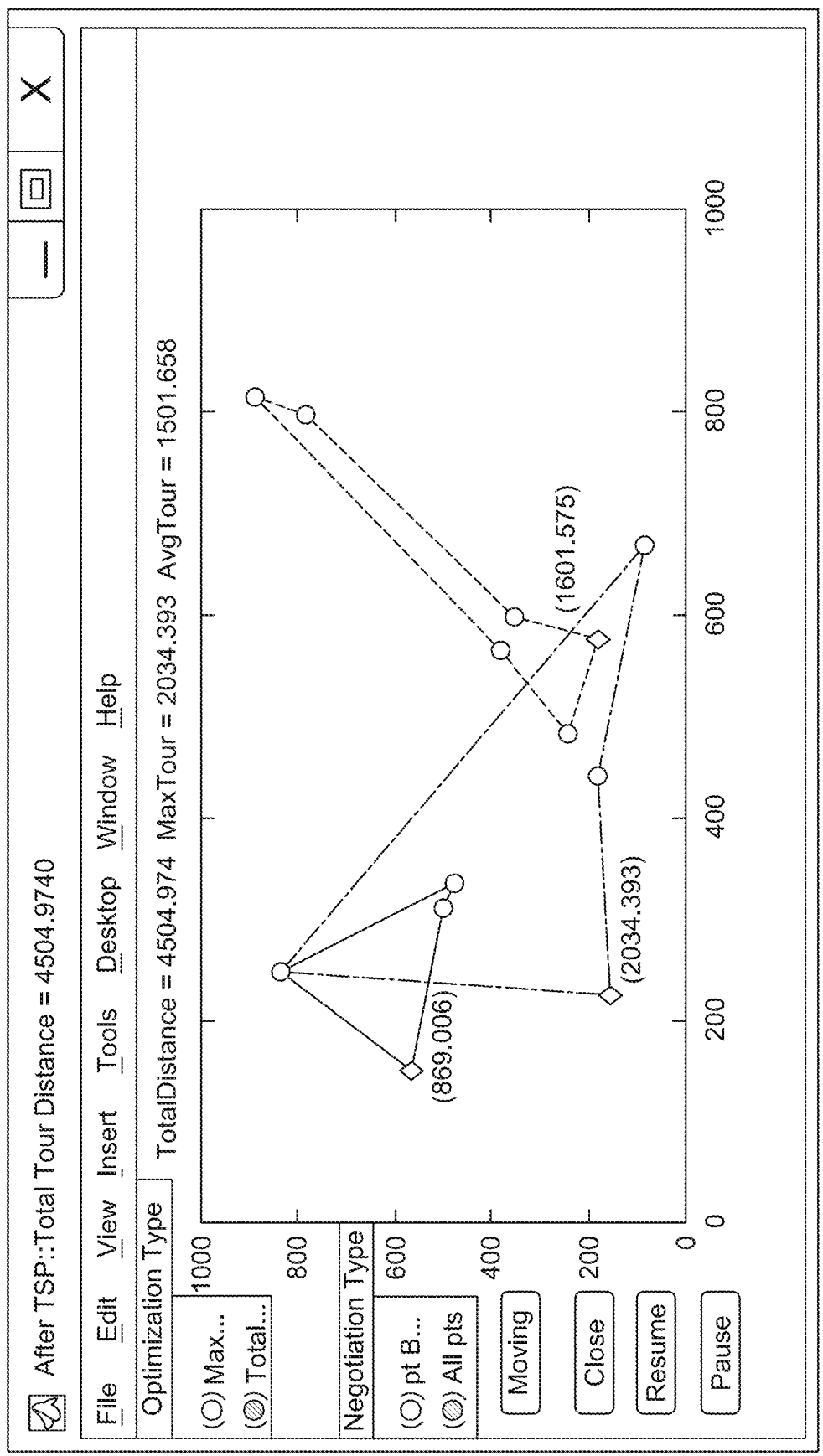
Figure 10C:
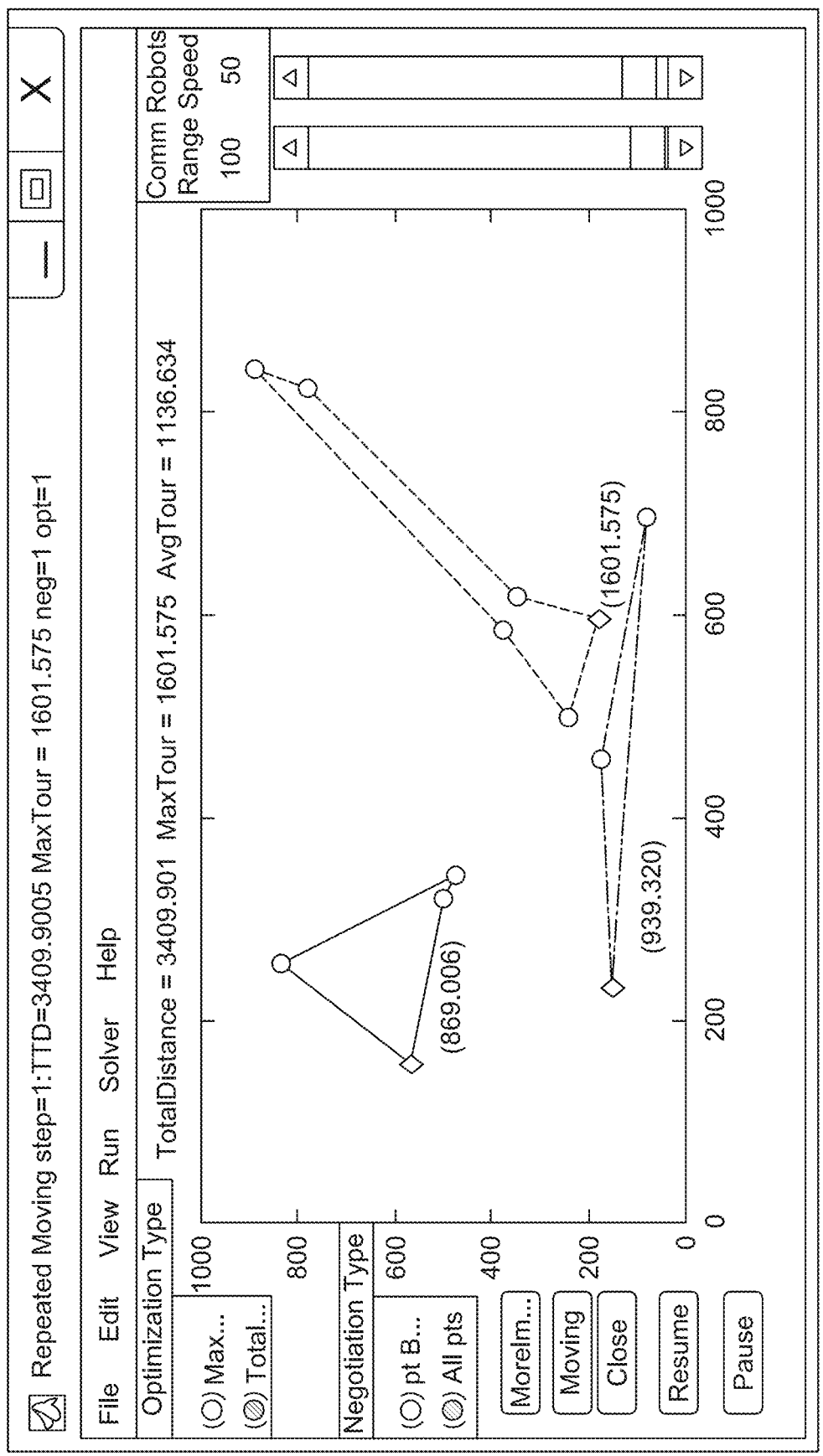
Figure 10D:
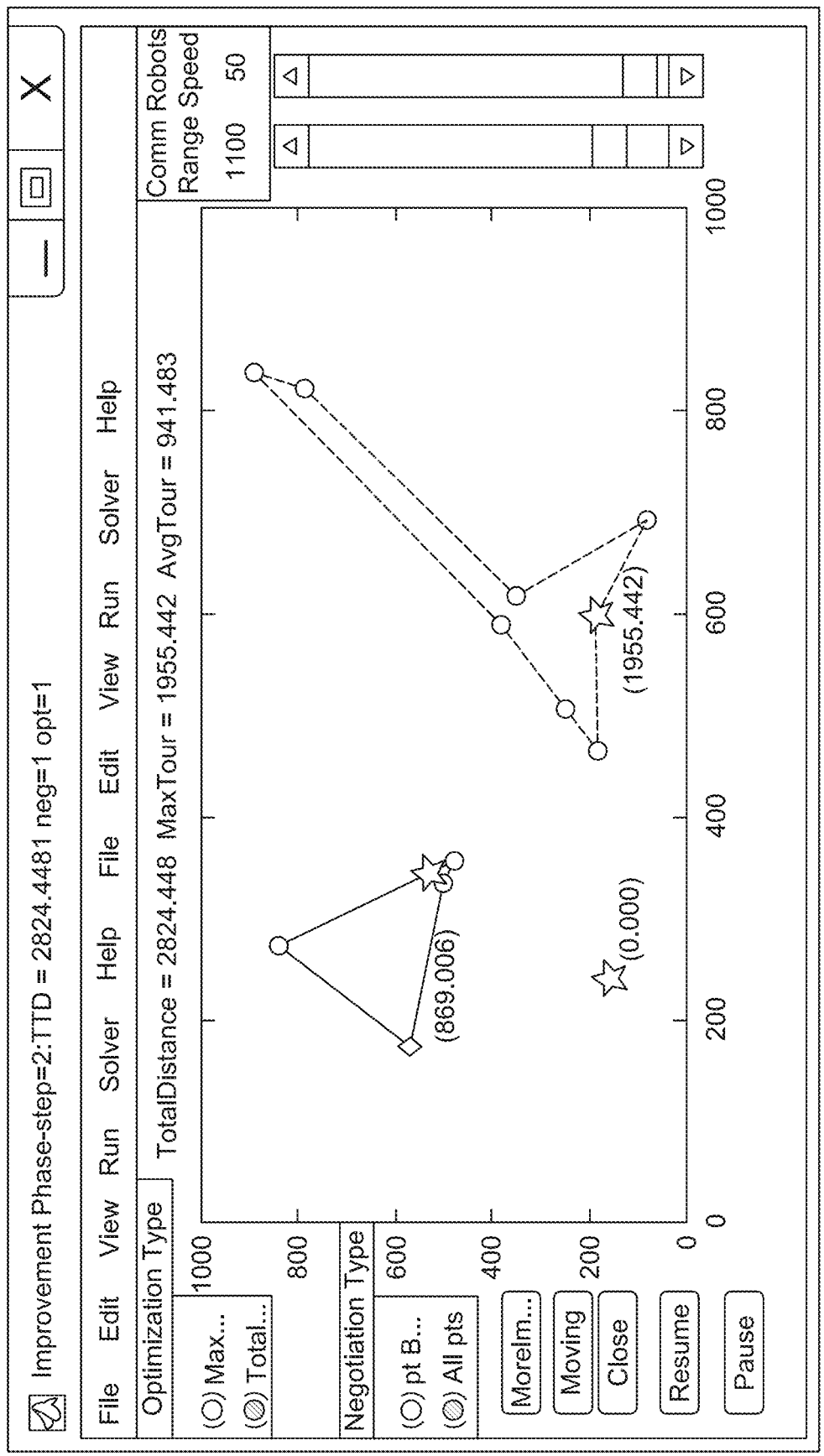

FIG. 9 is a flowchart of application of the Move and Improve mechanism to the dynamic mission planner. The Move and Improve mechanism has four processes:

(1) the allocation process S901, (2) the tour construction process S903, (3) the overlapped targets elimination process S905, and (4) the solution improvement process S907. FIG. 10A depicts an initial target allocation for the three UAVs and FIG. 10B shows the resulting tours for each UAV based on the targets allocated to it. It is clear that there are some overlapping targets in FIG. 10B. These overlapping targets are negotiated and eliminated as shown in FIG. 10C. Finally, as shown in FIG. 10D, UAVs continue their negotiation to improve the solution quality over time by exchanging targets that would optimize the overall cost.

In some embodiments, the four processes may be performed in the cloud by the virtual UAVs 871. The real UAVs 105 are sent a target to be visited and begin traveling toward that target. The real UAVs 105 in turn may periodically report their status with regard to the target, and may also report other UAVs that are within their respective communication range and the distance to the other UAVs within communication range. This reported information may be transmitted to their respective virtual UAV 871, or to the cloud manager 851.

In some embodiments, the allocation process may be performed in the real UAVs 105 themselves in a distributed fashion. In these embodiments, the TSP may be solved in the cloud 101 by respective virtual UAVs 871.

Figure 11:
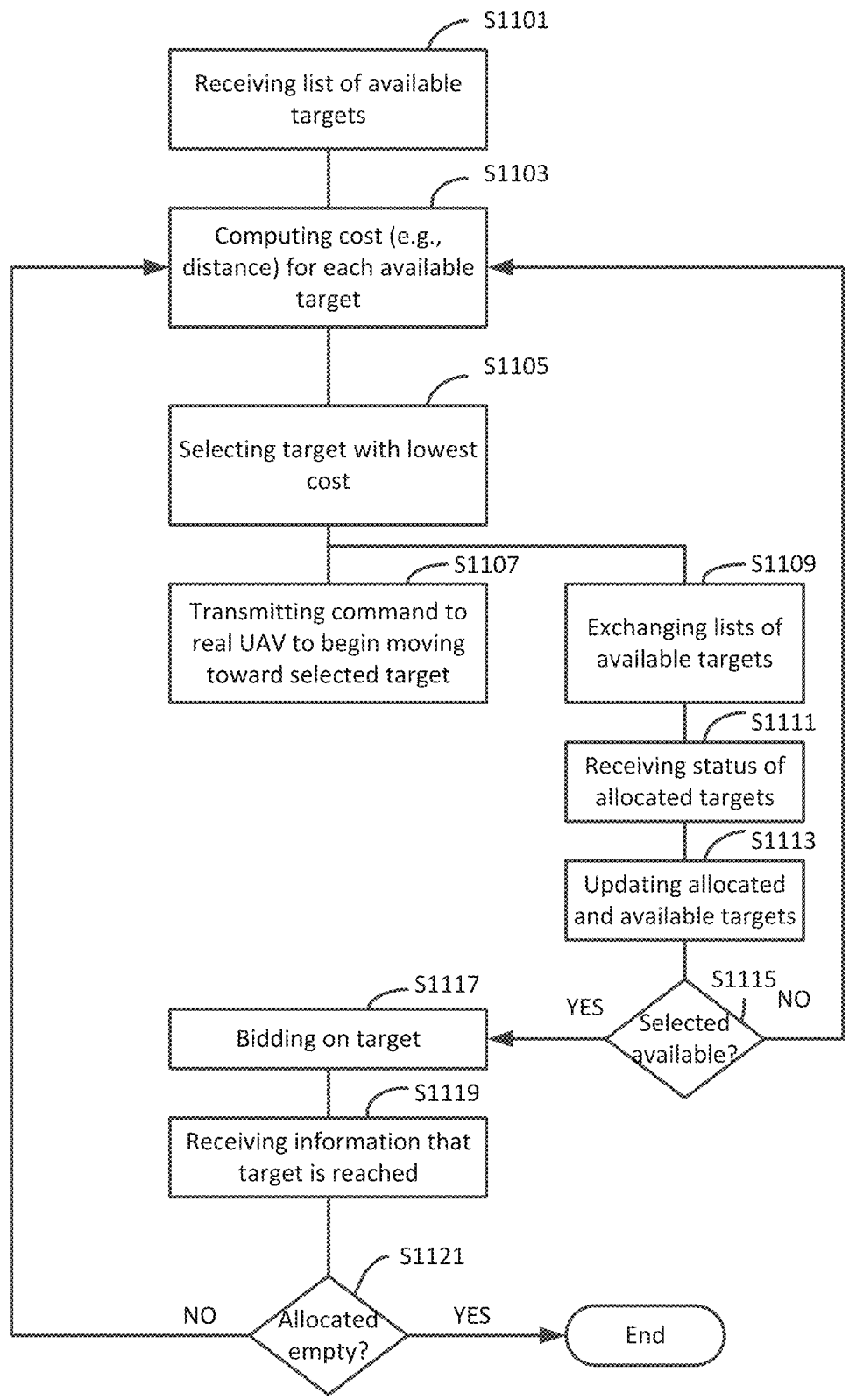
FIG. 11 is a flowchart of the allocation process of the move and improve algorithm.

FIG. 11 is a flowchart of the allocation process S901 (in FIG. 9). The allocation process S901 is shown as an algorithm in FIG. 12. In S1101 (lines 1, 2), each virtual UAV 871 receives the list of available targets to be visited. This list of targets can be sent, for example, by the cloud manager 851. Each virtual UAV $R_i$ 871 maintains two lists: (i.) the list of available targets that are not already allocated, and (ii.) the list of allocated targets, which contains the targets visited and allocated to the UAV $R_i$ itself. At the start of a mission, all targets are marked as available in each virtual UAV 871, and the list of allocated targets is empty. Then (line 23), each allocated target will be removed from the available targets list and the virtual UAV 871 informs its neighbors within its communication range to also remove it from their available targets list. The target becomes allocated to the UAV $R_i$ when it reaches the target. In this disclosure, an allocated target may also be referred to as a visited target.

Each virtual UAV 871 starts by, in S1103 (line 4), computing the cost (e.g. the traveled distance) of visiting each available target, and, in S1105 (line 5), selects the target with the lowest cost (e.g. the nearest target). Then, in S1107 (line 20), the virtual UAV 871 transmits a command to the corresponding real UAV 105 to start moving towards the selected target T, and in the meantime, in S1109, the virtual UAVs 871 exchange lists of available targets with other UAVs 105. In S1111, all virtual UAVs 871 are provided with information about allocated targets. As such, in S1113 (line 9), each virtual UAV 871 can update its own list of available targets by discarding those allocated/visited by other virtual UAVs 871.

In addition, in S1115 (line 10), a determination is made as to whether the currently selected target is no longer available (i.e. it was already allocated to another UAV). If NO in S1115 (the selected target is no longer available), the UAV 871 dismisses that target and looks for another one.

If the selected target $T_{selected}$ is still not allocated to other UAVs (YES in S1115), in S1117 (line 14), the virtual UAV 871 bids on this target with its neighbor UAVs. The neighbor UAVs will send their costs to the virtual UAV $R_i$ 871 which plays the auctioneer role for target $T_{selected}$, in response to the bidding request. Finally, the UAV R; will assign the target $T_{selected}$ to the virtual UAV 871 with the lowest cost, including itself.

A virtual UAV 871 completes the allocation process S901 when all its targets are marked as visited, either if it was allocated to it, or it was allocated to other UAVs that shared their lists with this UAV.

This process of moving towards the selected target $T_{selected}$ and exchanging available targets list is continuously repeated until the UAV $R_i$ 871 dismisses the selected target when it discovers that it is allocated to another UAV, or until it reaches the selected target (S1119; line 21). In the latter case, in S1119 (lines 22, 23), it adds this target to its own list of allocated targets and removes it from its own list of available targets. The virtual UAV $R_i$ 871 repeats the process of selecting a new target and moving to it until the list of available targets becomes empty (YES in S1121; line 3).

Upon the completion of the allocation process S901 (the list of available targets becomes empty), in S903, each virtual UAV 871 constructs a near-optimal tour across its allocated targets using a Traveling Salesman Problem (TSP) solver, shown as an algorithm in FIG. 13. The virtual UAVs 871 can use any conventional TSP tour construction algorithm, such as Lin-Kernighan Heuristic (LKH) or an evolutionary approach such as. (See S. Lin and B. W. Kernighan, "An effective heuristic algorithm for the traveling-salesman problem," *Operations research*, vol. 21, no. 2, pp. 498-516, 1973, and H. Braun, "On solving travelling salesman problems by genetic algorithms," in *Parallel Problem Solving from Nature*, pp. 129-133, Springer, 1991, each incorporated herein by reference in their entirety. In some embodiments, an existing implementation of the LKH TSP solver may be used for tour construction.

As a result of the tour construction process S903, each virtual UAV 871 generates a first solution to the Multi Depot Multiple Traveling Salesman Problem (MD-MTSP) problem, and obtains a proper tour to follow for its allocated targets. In some embodiments, the virtual UAVs 871 transmit the allocated targets and proper tour to their respective real UAV 105.

However, it may happen that some targets would have been allocated to several UAVs during the allocation process S901. This is possible as UAVs may incur communication delays in communicating through the cloud and may not have the opportunity to exchange their lists of allocated targets, either directly or indirectly through other neighbors. This means that, when UAVs exchange their lists of available targets, and after any exchange, the resulting list in each virtual UAV 871 will contain the union of allocated targets of the two lists. To illustrate this through an example, consider a hypothetical situation where UAV A provides his list (T1: allocated; T2: not allocated; T3: not allocated, T4: not allocated) to UAV B, and on a separate instant UAV A provides a more updated list (T1: allocated; T2: not allocated; T3: not allocated, T4: allocated) to UAV C. When B and C meet, C will share its updated list with B, so B will mark T4 as allocated. When C receives from B telling that T4 is not allocated, it will not consider this outdated information, since the (allocated) information (which is set by default) is always more recent than the (not allocated) information.

The objective of Process S905, shown as an algorithm in FIG. 14, is to improve the MD-MTSP solution by eliminating common targets allocated to more than one UAV, through a distributed market-based approach, while the real UAVs 105 are moving through their constructed tours (refer to FIG. 10D). As such, during the tour missions, virtual UAVs 871 exchange their lists of allocated targets, and in case there are one or more overlapped targets, the virtual UAVs 871 will bid on these targets. More precisely, considering a UAV $R_i$ and a UAV $R_j$ both have the same allocated target $T_k$. If the gain resulting from eliminating $T_k$ from the tour of $R_i$ is greater than the gain resulting from eliminating $T_k$ from the tour of $R_j$, then $T_k$ will be eliminated from the tour of $R_i$, and virtual UAV $R_i$ 871 computes a new tour based on its remaining allocated targets. The gain is defined as the difference between the old tour cost before removing the common target and the new tour cost after target removal. The gain differs by whether the goal is to minimize the total cost (the sum of traveled distance) or to minimize the maximal individual cost (the maximum tour). Moreover, in case there are several overlapped targets, the virtual UAVs 871 can bid on them separately (one by one) or all together.

Returning to the previous example, where of minimizing the total cost, gain is defined:

$$gain_i = C(Tour_R i) - C(Tour_R i \setminus T_k)$$

$$gain_j = C(Tour_R j) - C(Tour_R \setminus T_k)$$

where C ($Tour_R i$) is the cost of $Tour_R i$ containing the target $T_k$ and C ($Tour_R i \setminus T_k$) is the cost of after removing the target $T_k$. C ($Tour_R i\, T_k$) is computed using the TSP algorithm applied on the targets allocated to $R_i$, except the target $T_k$. $gain_i$ represents the gain obtained when target $T_k$ is removed from the tour of UAV $R_i$ and $gain_j$ represents the gain obtained when target $T_k$ is removed from the tour of UAV $R_j$. If $gain_i > gain_j$, it is more beneficial to remove $T_k$ from the tour of UAV $R_i$ and keep it in the tour of UAV $R_j$. If the objective function was to minimize the maximum cost, the gain will be defined as follows:

$$gain_i = \max(C(TourRi), C(TourRj))$$

$$-\max(C(TourRi \setminus T), C(TourRj))$$

$$gain_j = \max(C(Tour_R i), C(Tour_R j))$$

$$-\max(C(Tour_R i), C(Tour_R j \setminus T_k))$$

The last process (the solution improvement process S907), shown as an algorithm in FIG. 15, consists in looking for possible additional optimization of the tours resulting from Process S905. For that purpose, when a UAV $R_i$ enters in the communication range of a UAV $R_j$, it sends to $R_j$ a bidding request on the target $T_k$ that induces the biggest cost to visit in its tour. In other words, $T_k$ is the target that when removed from the tour of UAV $R_i$ gets the minimal cost, compared to other allocated targets. $T_k$ can be computed as:

$$T_k = \arg\min_{T_j} C(Tour_{Ri} \setminus T_j)$$

The virtual UAV $R_i$ 871 computes the gain obtained when it removes this target $T_k$ from its tour and the neighbor UAV $R_j$ calculates the extra cost obtained when it adds this target $T_k$ to its tour. In case of MinSum, the gain is computed as follows:

$$gain = [C(Tour_{Ri}) + C(Tour_{Rj})]$$

$$[C(Tour_{Ri} \setminus T_k) + C(Tour_{Rj} \cup T_k)]$$

C ($TourRj \cup T_k$) is computed using the TSP algorithm applied on the targets allocated to $R_j$ union $T_k$. If the gain obtained by removing $T_k$ from the $R_i$'s tour is greater than the extra cost obtained when adding $T_k$ to $R_j$'s tour, the neighbor UAV $R_j$ wins this target $T_k$, and therefore, $T_k$ will be removed from UAV $R_i$'s allocated targets, and added to the list of $R_j$'s allocated targets. In case of MinMax, the gain is computed as follows:

$$gain = \max(C(Tour_{Ri}), C(Tour_{Rj}))$$

$$-\max(C(TourRi \setminus T_k), C(TourRj \cup T_k))$$

Removal of target $T_k$ may occur more than once (according to the algorithm shown in FIG. 15) to improve the results.

Koubia et al. determined that for large communication ranges, the use of smaller number of robots would be beneficial in reducing the communication overhead, but at the expense on more load on the individual robots.

The cloud-based approach of this disclosure improves the efficiency of the distributed mission planning. Since the cloud 101 has global knowledge of each of the drones characteristics including their locations, battery levels, speed, and the set of waypoints to visit (received from the user), the dynamic mission planner can determine the optimal assignment for such a configuration.

More importantly, the dynamic mission planner incorporates fault-tolerance and dynamically prepares a recovery plan in case of a failure in executing the mission. By keeping track of drones' missions during execution, the dynamic mission planner detects any anomaly and acts accordingly. A drone may become disconnected from the virtualized drone. The dynamic mission planner may automatically remove the drone from a list of connected UAVs. When the dynamic mission planner automatically removes the UAV from the list of connected UAVs, the dynamic mission planner performs dynamic mission re-planning of the mission for other UAVs to visit waypoints assigned to the disconnected UAV, and sends the new waypoints assignments to the other UAVs. For example, a drone may crash and run out of energy during the execution of its mission, this requires a real-time re-planning of the missions of the other drones to visit the waypoints assigned to the failing drone and not yet visited, and then the new waypoints assignments will be sent to drones.

In this section, security threats are presented for Internet-of-Drones that can affect cloud-based drones management system and possible solutions to them are highlighted.

Table 1 summarizes the identified security threats against the cloud-based drones management system, with the corresponding countermeasures techniques. When drones are connected through Internet, they are exposed to a multitude of threats and attacks that may target the drone, the flight controller, the Ground Control Station GCS, the wireless data link or any combination of them See R. Altawy, A. M. Youssef, Security, privacy, and safety aspects of civilian drones: a survey, ACM Trans. Cyber-Phys. Syst. 1 (2)(2016) 7:1-7:25, doi: 10.1145/3001836, incorporated herein by reference in its entirety. Several risk factors that target the data integrity, authentication, network availability and information confidentiality can complicate their operations and can further prevent the accomplishment of their missions See D. He, S. Chan, M. Guizani, Drone-assisted public safety networks: the security aspect, IEEE Commun. Mag. 55 (8)(2017) 218-223, doi:10.1109/MCOM.2017.1600799CM, each incorporated herein by reference in its entirety.

The cloud-based system involves different components. Thus, attacks can occur at different layers: (1) The Proxy Layer, (2) The Cloud Layer, (3) The Drone Layer.

The Proxy Layer in the software architecture supports the MAVLink protocol. It allows the exchange of predefined messages between the drones and ground stations. The MAVLink Protocol does not provide any kind of security. There is no confidentiality, nor authentication mechanisms. The protocol communicates with drones over an unauthenticated and unencrypted channel. Anyone with an appropriate transmitter can communicate with the drone. This means it is possible to inject commands into an existing session. Thus, the MAVLink protocol is exposed to different attacks, including:

Spoofing: sending a false wireless control command, using the data link, that appears to be from the drone or from the ground control station. The attacker blocks the communication between the UAV and the GCS and begins commanding the drone herself. In order to mitigate the risk of C2 data link spoofing, mutual authentication is important.

Jamming: An adversary disables the reception of control signals from the ground control by the drone. The communication between the drone and the GCS is blocked and the aircraft to go into a lost link state. Implementing fail-safe mechanisms can help mitigate the risks.

Data interception: the signal messages are able to be read by unauthorized parties. The data collected by drones is transmitted back to the user or the cloud. Since the connection used is not always secured. A hacker can easily intercept and steal the data. Authentication and encryption should be used on the link to mitigate this risk and to guarantee the confidentiality and integrity of the exchanged data.

In fact, the MAVLink protocol is not secured and can be hacked quite easily. It is crucial to design secure mechanisms for authentication and encryption of MAVLink data streams to avoid harmful attacks.

The Cloud Layer 703 contains several components. (i.) Storage component 731, 733 provides storage services for streams of data originated from UAVs. Data is stored in the cloud either in regular SQL database or in a distributed file system 733 (HDFS, NoSQL database). Database injection attacks can target the cloud layer.

SQL injection: Hackers exploit the vulnerabilities of these databases and inject a malicious code in order to bypass login and gain unauthorized access to backend databases. If successful, hackers can manipulate the contents of the databases, retrieve confidential data, remotely execute commands, or even take control of the web server.

TABLE 1

Security threats against Dronemap Planner and countermeasures.

| Categories | Threats | Countermeasures |
| --- | --- | --- |
| Attacks on Confidentiality | Eavesdropping | Encryption of the data link. AES |
|  | Main-in-the-middlce attack | End-to-end encryption |
| Attacks on Integrity, availability | GPS spoofing and jamming attack | Anti-spoofing techniques, Anti-jamming antenna |
|  | C2 Data link jamming |  |
|  | Denial of service | Fail-safe mechanisms, authentication |
|  | C2 Data link spoofing | Anomaly-based intrusion detection systems, fail-safe mechanisms |
|  |  | Mutual authentication, (PKI) certificates |
| Attacks on availability | Obstacles and civic challenges | Collison avoidance techniques, air traffic management |
|  | Environmental conditions | All approaches |

OK TO ENTER: /J.C/
OK TO ENTER: /J.C/
4QK TO ENTER: /J.C/

TABLE 1-continued

Security threats against Dronemap Planner and countermeasures.

| Categories | Threats | Countermeasures |
| --- | --- | --- |
| Attacks on Confidentiality, availability, authenticity, integrity | Vulnerabilities of MAVLink | Authentication and encryption mechanisms OK TO ENTER: /J.C/ |
| Attacks on integrity | Hijacking | Hash functions, MAC, Authentication, encryption |
| Attacks on authenticity | UAV spoofing or jamming | Authentication and encryption of the data, password |
| Attacks on confidentiality and integrity | C2 data link interception | Authentication and encryption |

NoSQL injections target "big data" platforms 731. These platforms are vulnerable to threats because of the lack of authentication, no support for transparent data encryption and no support for secure communications. Data is sent in clear and could easily be sniffed on the network.

(ii.) Web services (WS) component 741 (REST and SOAP) allow clients to control the missions of the drones and their parameters. Web services are also potentially exposed to underlying vulnerabilities including: DOS attack, Message monitoring and copying, Message source spoofing.

Drone Layer

Attacks on drones can potentially lead to taking control of or crashing them. Examples of attacks are:

Physical challenges: Drones 105 are vulnerable to a multitude of physical threats that can complicate their operation and further prevent the accomplishment of their missions. Their presence supposes an extra risk that should be considered. The interference (animals, humans), the environmental conditions (wind, temperature) affect the operation of UAV and may cause accidents. Dynamic obstacles or the presence of civic constituents such as trees, electric cables, and buildings are important examples of such challenges. These threats can be evaded using technology for recognizing adjacent air traffic and collision avoidance techniques.

GPS spoofing attacks: The basic idea in GPS spoofing is transmitting fake GPS signal to the control system of the drone, usually more powerful than the original GPS signal coming from the satellite. As a result, the victim might use the faked signals instead of the original ones. GPS Spoofed signals are providing different wrong location to the drone and let it changing its trajectory in order to mislead the drone. GPS enables a drones navigation, and due to non-encryption of the signals they can be easily spoofed, which directly influences the operator commands. This can possibly result in a drone crash. Anti-spoof algorithms can help mitigate GPS spoofing attacks.

GPS jamming attacks: A drone which uses GPS could be attacked by jamming the GPS signal, making it unable for the drone to fix its position. Jamming aims to disrupt all communication. Anti-jamming antenna selection and orientation can help mitigate jamming attacks.

Eavesdropping: A successful man-in-the-middle attack against a drone allows an attacker to know all of the commands sent from the GCS to the drone, and enables the attacker to monitor all telemetry sent by the drone because of the violation of the confidentiality of the drone.

Hijacking: A successful man-in-the-middle attack against a drone would also enable an attacker to transmit unauthorized commands to the drone and take control of it from the GCS (i.e., hijacking) due to the integrity violation of the drone.

Denial-of-Service: A Denial-of-Service (DoS) attack against a drone results in the UAV becoming unresponsive to the GCS, or vice versa, due to the violation of the system's availability.

Finally, these attacks can be classified into four general categories: Interception (Attacks on confidentiality), Modification (Attacks on integrity), Interruption (Attacks on availability) and Fabrication (Attacks on authenticity). Interception can be achieved by eavesdropping on channels. This facilitates traffic analysis and disclosure of message contents. The cloud-based system should employ mechanisms to mitigate unauthorized disclosure of the telemetric and control information. Different encryption standards such as AES can be used for encryption of the data link. See J. Daemen, V. Rijmen, The design of rijndael: AES—the advanced encryption standard, Information Security and Cryptography, Springer Berlin Heidelberg, 2013, incorporated herein by reference in its entirety. Modification means replacing an original message to a particular service with a modified one. Integrity can be checked by the use of hash functions, message authentication code and Authenticated encryption cryptographic primitives. See N. M. Rodday, R. d. O. Schmidt, A. Pras, Exploring security vulnerabilities of unmanned aerial vehicles, in: IEEE/IFIP Network Operations and Management Symposium (NOMS), 2016, pp. 993-994, doi: 10.1109/NOMS.2016.7502939, incorporated herein by reference in its entirety. Interruption means that a message from/to a particular service is blocked. It includes Routing attack, Channel jamming, Denial of service. Countermeasures against these type of attacks are Strong authentication and incident detection and reporting mechanisms. See Rodday et al. Fabrication includes message forgery, UAV spoofing, and base station spoofing. Authenticity is ensured by the use of passwords, which may involve a certification agent. See He et al.

The disclosed cloud-based system supports different types of applications of drones/robots over the Internet. Several real-world applications have been developed with the cloud-based system to demonstrate its effectiveness in enabling new IoT applications.

For all applications that follow, the cloud-based system was deployed into a DreamCompute cloud instance provided by DreamHost service provider. It is also possible to deploy it in any other cloud or public IP server like Amazon AWS or Azure. A minimal instance of the DreamCompute has been used with 80 GB of storage, 4 GB of RAM, and 2

Virtual CPU. As the cloud-based system is launched, all of its services are deployed and are accessible from a public IP address with at a predefined port number.

Web-Based Control and Monitoring of MAVLink Drones

The primary objective of the cloud-based system is to control drones and monitor them through the Internet. A video demonstration of Web-based drone mission control and planning is available. See Autonomous Mission with GoPro Camera view on drone using Dronemap Planner, 2017, [Online]. Available: www.youtube.com/watch?v=QqtnLHKJ12k, incorporated herein by reference in its entirety.

A Web client interface has been developed that interacts with the cloud-based system using Web Services and Web-sockets interfaces. Web Services calls were used to invoke remote services on the cloud, like getting the list of available drones connected to the cloud. FIG. 16 presents the list of active drones for an administrator user. The figure shows three active drones that the user can control and monitor. The drone list interface provides the user with information of every connected drone including the IP address 1601, port number 1603, and the MAVLink System ID 1605. In addition, the physical address of each drone is shown based on its GPS coordinates. Google Geolocation Web Services API may be used to map the physical location addresses with GPS coordinates. The following video demonstration shows the drones' automatic detection and removal feature of the cloud-based system. When a drone connects to the Internet, it is automatically displayed in the web interface that periodically invokes the SOAP web service method get DronesList( ). On the cloud side, the Watchdog process is keeping track of connected drones by checking their heartbeat messages. If a certain number of consecutive heartbeat messages do not reach the cloud from a drone, the latter is considered as disconnected and is automatically removed from the drone list. The time interval for listening to consecutive lost heartbeat messages is set by the cloud-based system administrator in the system configuration file to decide about whether the drone is still active or disconnected. 5 seconds has been used in the experiments.

Figure 17:
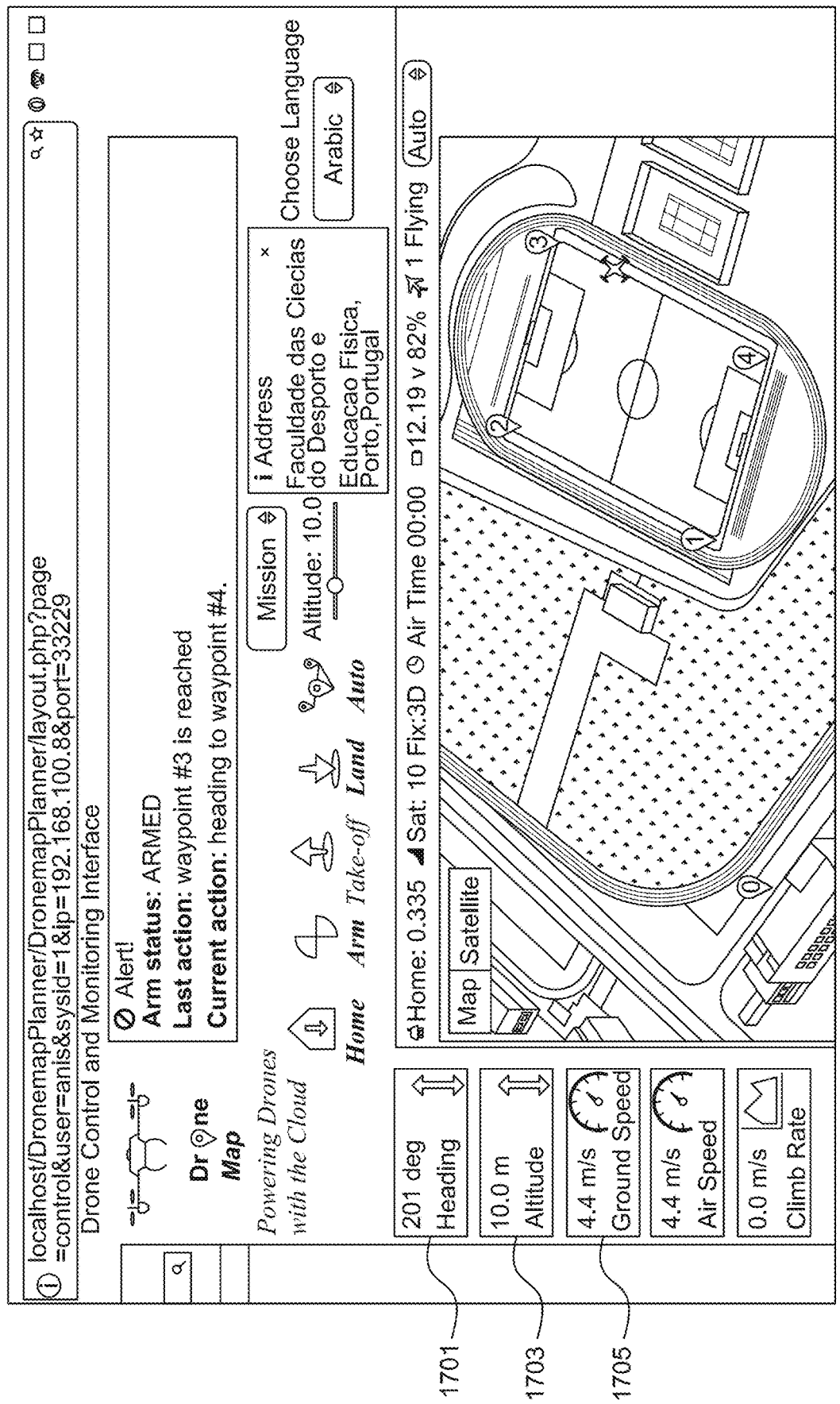
FIG. 17 is a display for a graphical user interface on a Web ground station in accordance with an exemplary aspect of the disclosure.

Once the user connects to a drone from the list of available drones, he/she will be redirected to the drone control interface illustrated in FIG. 17. FIG. 17 depicts the cloud-based system Web graphical user interface.

The web interface contains all information about the drone, including altitude 1703, air/ground speeds 1705, heading 1701, battery level, location address based on GPS coordinates, and GPS fix status. These real-time data are received through the JavaScript Websockets client interface that connects to the Websockets interface of the cloud-based system. This ensures real-time updates of the Web interface with the status of the drone, and a reliable bi-directional communication between the Web ground station of MAVLink streams and the MAVProxy through the Websockets protocol. A comprehensive JavaScript/Ajax library was developed to parse and process incoming MAVLink messages and update the Web interface in real-time.

In what concerns control commands, the Web ground station allows the user to change the flight mode, arm/disarm the drone, take-off and landing, navigate to a waypoint in a guided mode, load and save a mission, execute a mission in autonomous mode, and return to launch. A mission refers to visiting a set of waypoints. The Web ground station allows adding and removing waypoints to a mission and save it to the drone, through the cloud-based system. All these control actions are performed through the SOAP Web Services interface using remote method invocation. For example, to take-off, a Web service client invokes the take-off method of the Cloud.

Manager Web Services called MAVLinkControllerService. FIG. 18 presents an excerpt from the WSDL (Web Service Description Language) document. The use of Web Services provides much flexibility considering that it is platform-independent. In fact, it is possible to access cloud resources through Web Services using any programming language such as Java, C++, Python, etc.

For security purposes, current browsers do not allow to use JavaScript for directly invoking remote SOAP Web Services methods. This is a known issue that prevents from directly invoking Web Services methods through client-side scripting. This problem may be overcome by developing, using PHP, a proxy SOAP client interface that invokes the SOAP Web Services of the Cloud Manager. As such, the parameters of the remote methods are sent from the browser in JavaScript using a typical Ajax GET request to the PHP SOAP client page, which prepares the corresponding SOAP message using the received parameters, invokes the Web service and returns the result to the browser through Ajax response.

The Web ground station allows for the definition of missions for the drones in real-time, changing of the mission dynamically by adding and/or removing waypoints as required, and navigating to a particular waypoint in Guided mode.

It also to be noted that the cloud-based system is able to track the communication quality between the drone and the cloud and visualize it in the web interface. Two types of link quality estimators are used, namely, short-term and long-term link quality estimators, using exponentially weighted moving averages over different time windows. The link quality information is important to make sure about the reliability of the drone-cloud connection before starting any mission and allows the cloud to select drones with good communication qualities, and also to take preventive actions if a drone communication quality drops over time and more generally ensures contingency management.

The cloud-based system offers great potential for developing new Internet-of-Drones applications thanks to its open software interfaces and service-oriented architecture design.

The cloud-based system may be used to develop, DroneTrack, a follower application which performs real-time tracking of moving objects through the cloud using their GPS coordinates. The application consists of a moving target object (e.g. person, vehicle, etc.) that is being tracked in real-time by a drone. The moving object periodically sends GPS coordinates using a mobile application to the server, which forwards it to the drone.

The DroneTrack follower application may be developed as an extended software component of a cloud architecture. The Follower component defines software Web service interfaces to expose its functionalities as SOAP Web Services to the client application from which it receives commands and GPS coordinates of the target object. In addition, it interacts with the Drone and MAVProxy components of the cloud-based system to send GPS navigation commands to the drone. The Follower Web Services methods are exposed in the ApplicationWS component, which as a SOAP Web service module that exposes all applications services, including the Follower application.

Figure 19:
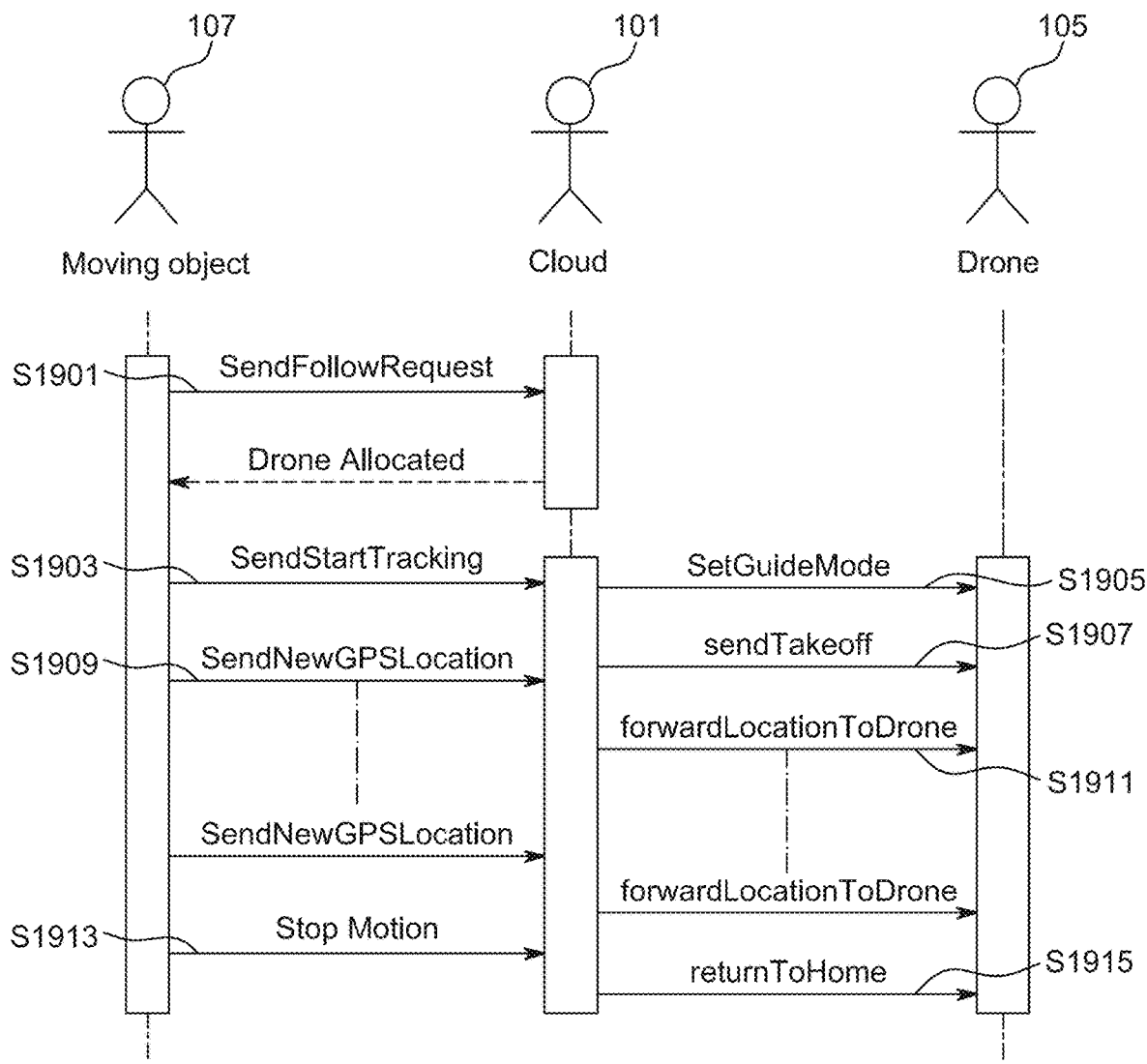
FIG. 19 is a sequence diagram for a follower application in accordance with an exemplary aspect of the disclosure.
Figure 20:
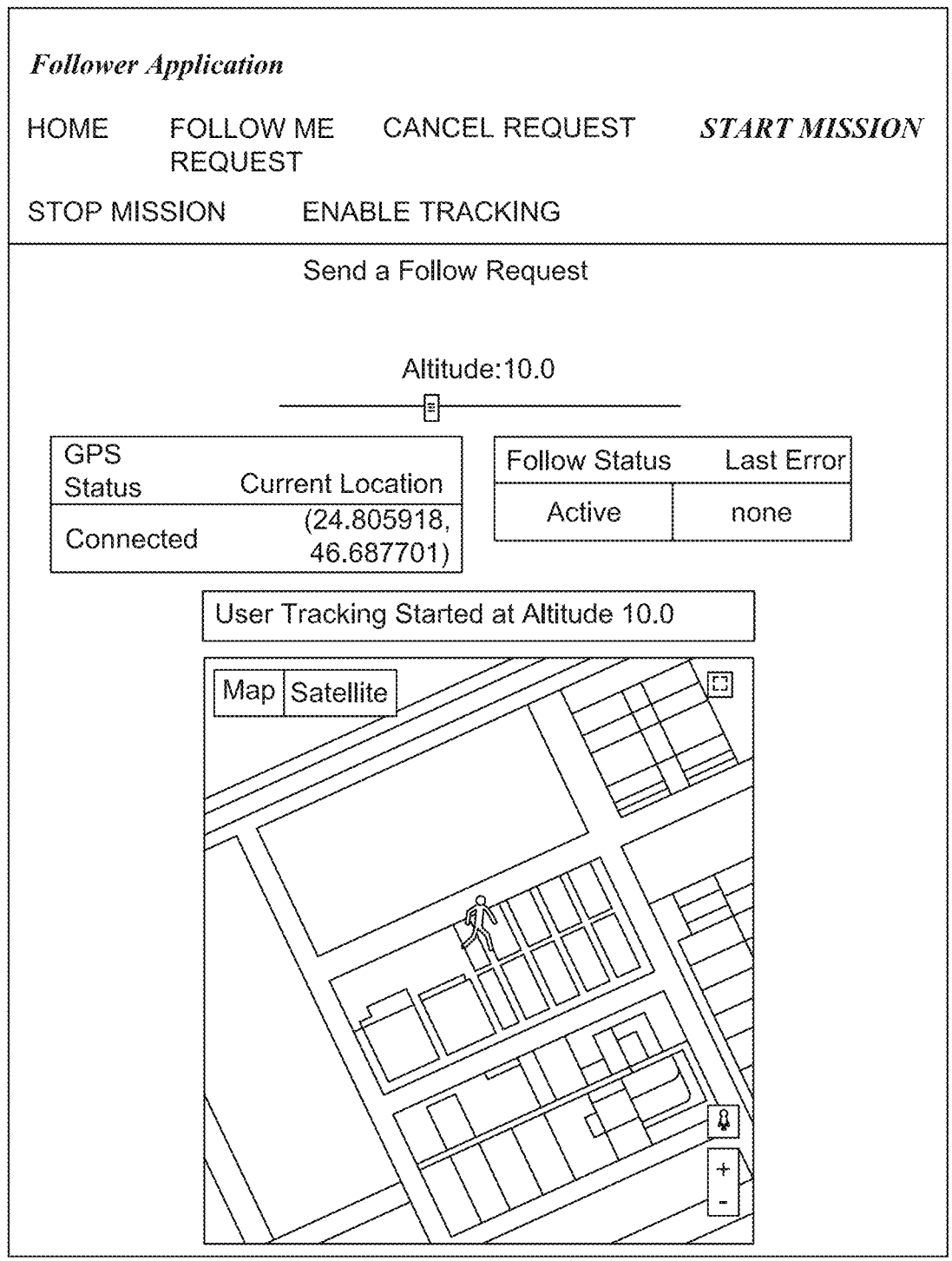
FIG. 20 is a display for a graphical user interface for a client application in accordance with an exemplary aspect of the disclosure.

FIG. 19 is a sequence diagram of the DroneTrack Follower application, and FIG. 20 shows the follower client mobile application.

More specifically, the follower application may include five Web Services methods available for the end-user client applications, which are as follows:

Follow Request web service method (S1901): this method allows a user 107 to send a follow request to the cloud 101. The request has as a parameter the current location of the user to track. Once the request is received, the follower cloud application will search for an available drone among all drones registered in the cloud and select the one that will minimize the cost of the mission and with sufficient energy. In the current implementation, the cost is considered as the distance to the person to follow; i.e. the closest drone to the person will be selected and allocated for the tracking mission. It is possible to consider other metrics for the cost to select a drone namely the remaining energy, the type of drone, availability.

Cancel Follow Request web service method: The user 107 can cancel the request at anytime before the tracking is started, which release the allocated drone and make it available.

Start Tracking web service method (S1903): When the user 107 starts the tracking, the drone 105 switches to the GUIDED flight mode (S1905), arms its motors (if not), and flies to the specified altitude (S1907), then heads towards the location of the moving object 107. As long as the user 107 moves, new GPS coordinates are sent (S1909, S1911) to the drone 105 in real-time to track it, if the tracking is enabled. Technically, the mobile follower client application opens a Websockets connection with the cloud-based system to exchange the GPS coordinates in real-time. On the follower client application side, the Websockets inbound stream receives the GPS location of the drone in real-time, and updates it in the Web interface using Google Maps so that the user 107 can track the location of the drone.

Stop Tracking web service method: When the user 107 cancels the tracking (S1913), the drone will stop the tracking mission and then returns to its home location (S1915) and becomes available for other missions.

Enable/Disable Tracking web service method: this command allows the user to enable or temporarily disable the tracking without completing the mission. When the mission is disabled, the drone 105 will still be flying and allocated to the user 107, but it will not track its new GPS locations until the tracking is enabled again.

Drone Programming API

In this section, a demonstration of how the cloud-based system makes it simple to develop applications of drones through cloud Web Services APIs. In what follows, an example written in Java is provided, which can also be written in any other language.

The cloud Web Services APIs provide pragmatic tools such that no prior background on drones, robots or MAVLink is needed to develop programs for controlling and monitoring UAVs. In particular, students at the undergraduate level, or even in high school, may use the cloud Web Services API for learning drone programming. An exemplary DroneClient UML class diagram is presented in FIG. 21A. A similar drone client APT could be developed for other programming languages like Python.

In the class diagram of FIG. 21A, a Drone Class includes settable attributes of serverIP, hostID, droneClient, cloudClient, and droneWebsocketsClient. The serverIP takes a value of an IP address of a server, as a string. The hostID takes a value of a system ID assigned to a drone. The droneClient is an object of type DroneWSClientImpl. The cloudClient is an object of type CloudWSClientImpl. The droneWebsocketsClient is an object of type DroneWebsocketsClient.

The Drone Class includes methods that may be called for an instantiated drone client. The DroneClient method instantiates a new drone client and sets a value of the server IP address. A connect method returns a Boolean value, and checks to determine if the drone client object can verify that a drone with the designated system ID exists and can connect to Web services and Websockets servers. A getDroneHostID method obtains the system IDs of a list of host drones. The getDroneHostID may also verify the existence of a drone having a specified system ID. Various methods have been developed for controlling a drone to perform some action. For example, an arm method causes the drone to arm itself. In some embodiments, an action of arm may involve turning on a video camera. Comparable methods have been developed to disable the action. For example, a disarm method causes drone to disarm itself. In order to perform some mission, methods such as takeoff, land, flightMode, and goToGoal are included in the drone class. The takeoff method may take an altitude that the drone may move to upon takeoff. The flightMode may include values of guided or return to location (RTL). The goToGoal method may set a geolocation as a destination target. In the example embodiment, the location is of type Location3D. The drone client API may also include methods for obtaining the status of a drone. The example, a method getRemainingBatteryLevel may access the battery level of the drone.

The control actions associated with the Drone Class methods are performed through the SOAP Web Services interface. The drone class API hides the details of the underlying functions performed by the Web services 807 and the Cloud Manager 851.

FIG. 21B is an example program written in the Java programming language that incorporates the drone client API of FIG. 21A. The example program is for a mission for a drone. The drone client API provides high-level operations for interacting with the drones through the cloud-based system.

In Line 3 of the program in FIG. 21B, a new DroneClient object is created specifying the IP address of the cloud server. In Line 4, the drone client object attempts to connect to a drone with a system ID equal to 1. The connection is successful if the client is able to connect to all Web Services and Websockets servers, and a drone with the specified system ID exists. If the drone exists, the mission will be executed. In Line 6, the user can query the system about the remaining battery level of the drone. Lines from 7 to 15 define a new mission that includes changing the flight mode to guided, arming the drone, taking-off for an altitude of 20.3 m, going to a pre-defined location, and finally returning to launch. The program is illustrative and more sophisticated event-driven programs could be written based on the API.

Controlling a Drone Using ROSLink

In this section, a demonstration of how the cloud-based system is able to control and monitor ROS-enabled robots and drones.

In Koubaa et al., the cloud-based system is used to control the Turtlesim, the simulated turtle robot in ROS. See A. Koubaa, M. Alajlan, B. Qureshi, ROSLink: Bridging ROS with the Internet-of-Things for Cloud Robotics, vol. 2, Springer International Publishing, Chain, pp. 265-283. doi: 10.1007/978-3-319-54927-9_8, incorporated herein by reference in its entirety. An open-loop control application of the motion of Turtlesim robot is used to follow a spiral trajectory. The impact of network and cloud processing delays on the generated spiral trajectories with varying the linear velocity steps is analyzed. It was observed that network delays resulted in slight discrepancy of trajectories obtained from sending commands over the cloud. However, the jitters remain in the order of tens of microseconds, which are acceptable and does not compromise the real-time control of the robot through the cloud.

In this section, the integration of Gapter EDU drone is illustrated, using ROSLink with Dronemap Planner, and its control over the Internet. See Gapter EDU drone, 2018. Available: edu.gaitech.hk/gapter/, incorporated herein by reference in its entirety. The concept can be applied to any drone or robot that operates with ROS.

Gapter EDU is a quadcopter designed for education and research. It has a Pixhawk autopilot hardware using the Ardupilot software, and re-enforced with an embedded single board computer Odroid XU4, with 2 GB of RAM, and Samsung Exynos5422 Cortex-A15 2 Ghz and Cortex-A7 Octa core CPUs. ROS Indigo is installed on Odroid XU4 and can interact with Pixhawk through the mavros ROS package. Mavros is a ROS package that represents an interface layer between ROS and Ardupilot systems using the MAVLink communication protocol. The mavros package provides required ROS topics and nodes that makes it possible to control Ardupilot systems using ROS commands.

A simulation model for Gapter EDU drone is developed using Software-In-The-Loop (SITL) and Gazebo simulator. SITL is a simulation platform of Ardupilot system, which allows to simulate Ardupilot drones. Gazebo is a 3D robotics simulation platform that supports ROS. The interaction between ROS and SITL is also based on the mavros package.

In order to enable a user to control Gapter EDU through Dronemap Planner, the ROSLinkBridge node for the Gapter EDU drone has been developed, which maps mavros commands and topics to ROSLink messages. These messages are exchanged between the ROSLinkBridge and the cloud-based system. The ROSLinkProxy software component in the cloud-based system is responsible for receiving ROSLink messages, parsing them and forwarding them to the user's Web application. The latter parses incoming ROSLink messages and updates the monitoring Web interface accordingly. In addition, the user can send control commands such as takeoff, land or motion commands through the Web interface using ROSLink messages. These messages are received through a Web Services in the cloud-based system, which will forward them to the drone to execute the commands.

Figure 22:
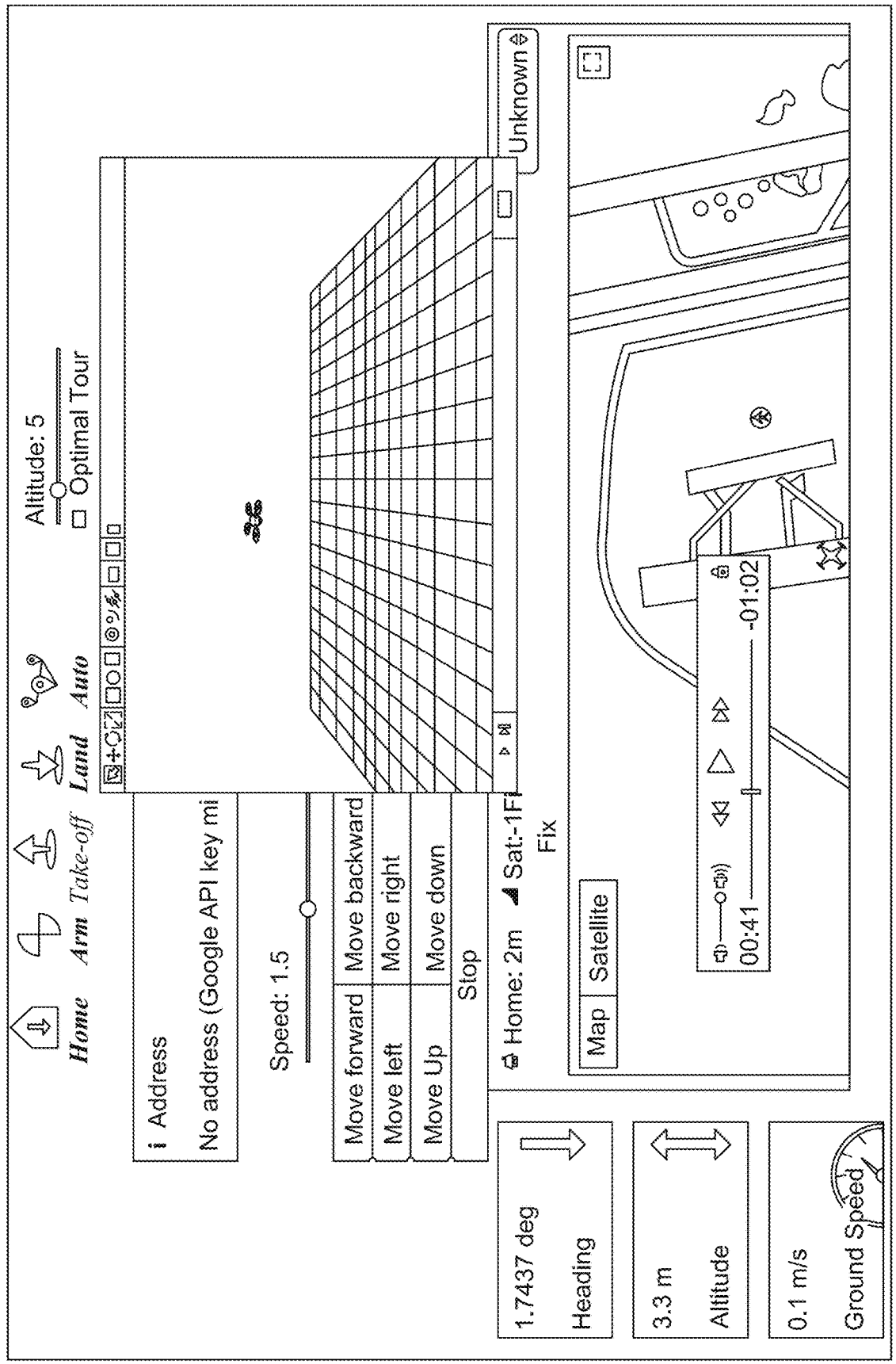
FIG. 22 is a display for a graphical user interface for control and monitoring of a drone in accordance with an exemplary aspect of the disclosure.

FIG. 22 shows the Web interface for the control and monitoring of Gapter EDU drone using ROSLink and the cloud-based system. The gray rectangle represents the Gazebo-SITL simulator of Gapter. A video demonstration is available. See Gapter EDU ROSLink control video, 2018, [Online]. Available://www.youtube.com/watch?v=eGYOH7akp-Q, incorporated herein by reference in its entirety. The user can send control commands such as takeoff, land, and also control the motion of the drone by sending velocity command through the directions buttons. In addition, the interface allows the user to monitor the status of the drone in real-time, similarly as with MAVLink drones.

Figure 23:
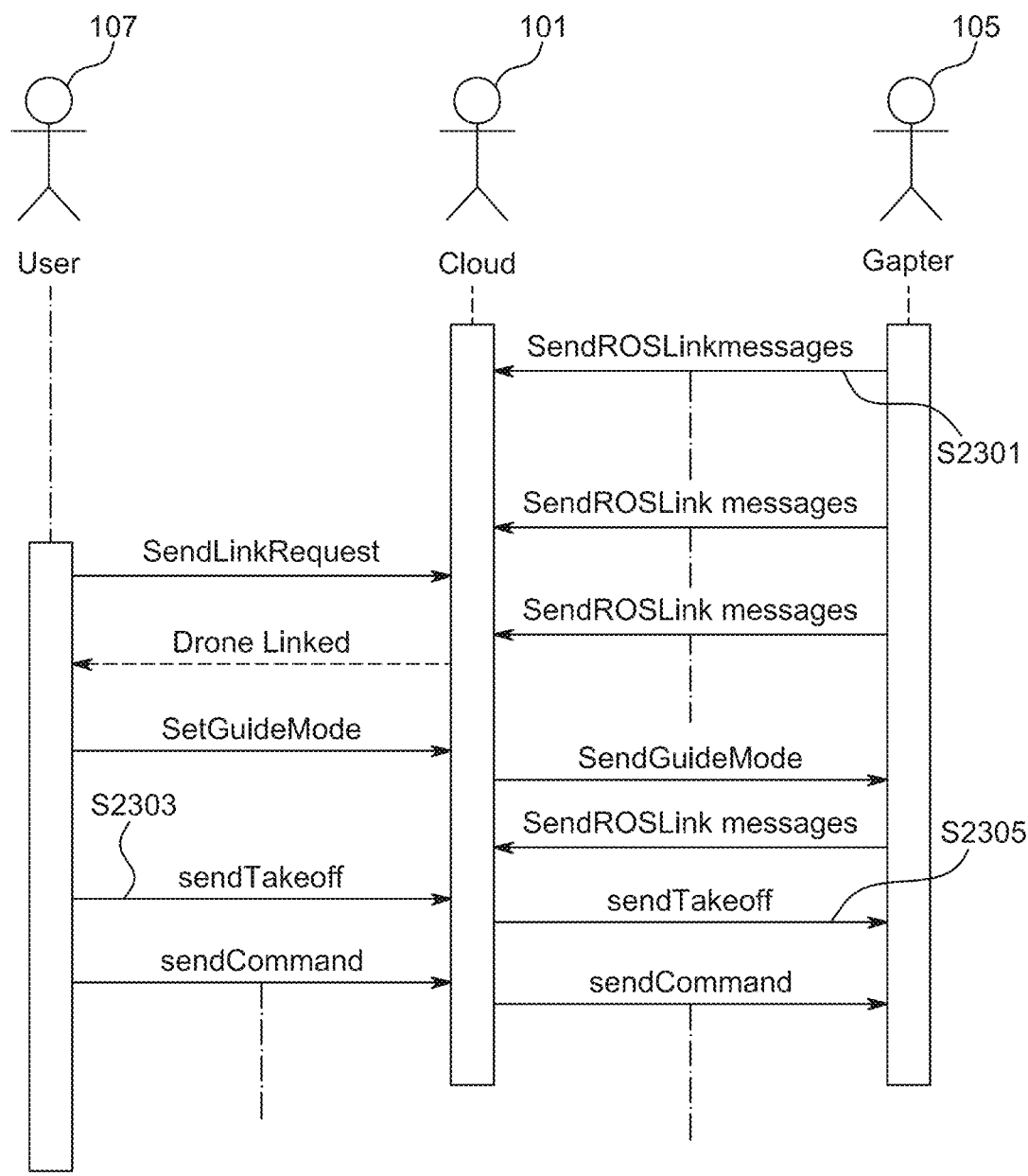
FIG. 23 is a sequence diagram for messages between a user client and a drone via the cloud network in accordance with an exemplary aspect of the disclosure.

FIG. 23 is a sequence diagram for messages exchanged between ROSLink and Gapter. When Gapter EDU drone 105 is started, its ROSLink bridge sends its messages (S2301 through UDP sockets to the cloud-based system 101. Then, cloud-based system 101 will forward them through the Websockets interface to JavaScript Websockets client interface of the Web client application. As with MAVLink, a comprehensive JavaScript/Ajax library has been developed to parse all incoming ROSLink messages and update the Web interface accordingly. The command messages are issued from the Web interface, and eventually will be sent through Websockets to the ROSLink bridge, which is responsible for parsing them and publish to the appropriate topic. For example, when a user clicks on the Take-off button of the Web interface, a ROSLink Take-off command message (S2303) is issued and sent to the cloud-based system 101, which will forward (S2305) to ROSLink bridge of Gapter EDU 105. When this ROSLink Take-off command message is received by ROSLink bridge 105, it will be parsed and converted to a ROS topic command. In this case, it will publish a message of type CommandTOL on the ROS topic takeoff.

In this section, an experimental study is presented for the performance evaluation of the cloud-based system. First, the real-time performance of the DroneTrack tracking application is evaluated in terms of tracking accuracy. Then, the impact of network and cloud delays on the performance of open-loop control applications of ROS-enabled robots is investigated.

Figure 24:
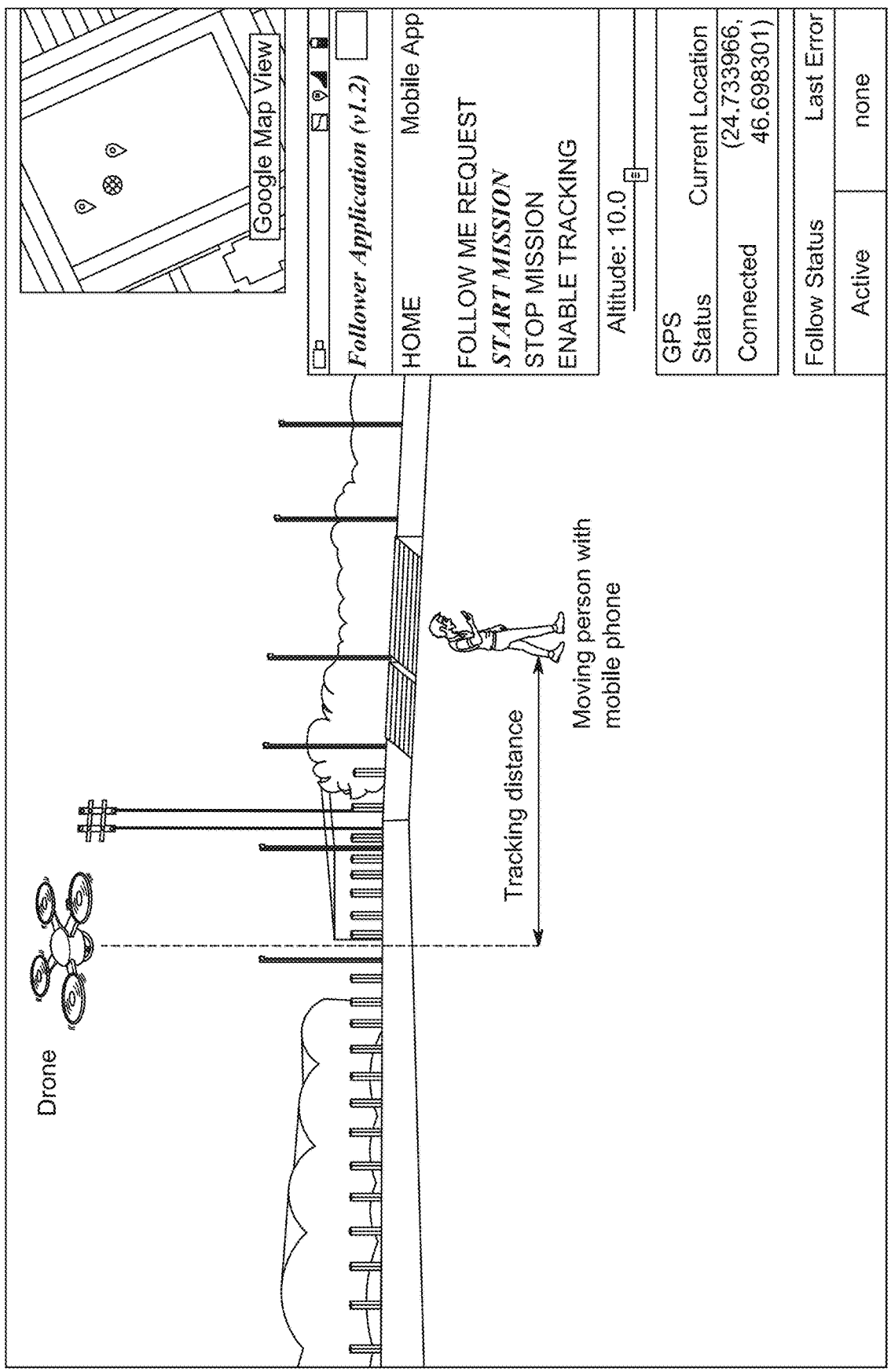
FIG. 24 illustrates a drone tracking application in accordance with an exemplary aspect of the disclosure.

Experiments were conducted with a real drone to demonstrate a proof-of-concept of the follower application and evaluate its performance. The experimental scenario of the tracking application consists in tracking a moving person with a real drone at the Football field in Prince Sultan University as shown in FIG. 24.

A custom built drone was used, a 450 mm quadcopter with DJI F450 Frame equipped with a Navio2 autopilot on top of a Raspberry PI 3 single board computer. Raspberry PI 3 has Quad Core 1.2 GHz Broadcom 64-bit CPU, with 1GB of RAM and MicroSD card for storage. It has an embedded WiFi and Bluetooth interfaces. Navio2 autopilot board is a drone controller hardware that is equipped with the UBlox NEO-M8N embedded GNSS receiver to track GPS signals with an external antenna, while allowing the connection of external GPS devices in its UART port. It has a dual IMU with two 9 degree-of-freedom IMUs, namely the MPU9250 and LSM9DS 1. Each IMU contains an accelerometer, a gyroscope, and a magnetometer which are fused together to estimate drone acceleration and speed. The video demonstration of this proof-of-concept is available. See Video demonstration of the follower application the football field of prince sultan university with a real drone, 2017, [Online]. Available://www.youtube.com/watch?v=9a8GnOBDe8U, incorporated herein by reference in its entirety.

The drone connects to the cloud-based system through a 3G WiFi router to which its streams its status and receives command through MAVLink messages. The user is connected to the cloud using a mobile device with 3G connection, sends tracking requests, and updates its GPS locations at 1 Hz frequency.

It has to be noted that commercially-available drones typically create their own ad-hoc network. In this case, the client application needs a point-to-point connection with the drone, and this prevents it to connect to the Internet. The network configuration of the Navio2 autopilot was changed (similar to other autopilots like Erle Brain) so that it connects to an infrastructure network (i.e. a 3G/4G WiFi router), to guarantee Internet connectivity. This is one of the reasons why Navio2 was used as autopilot since it enables connection with the Internet. For a comprehensive tutorial on how to set the network configuration of the autopilot, the reader may refer to a tutorial. See Gapter EDU, autopilot network configuration, 2018. Available://www.youtube.com/watch?v=eGYOH7akp-Q, incorporated herein by reference in its entirety.

Figure 25:
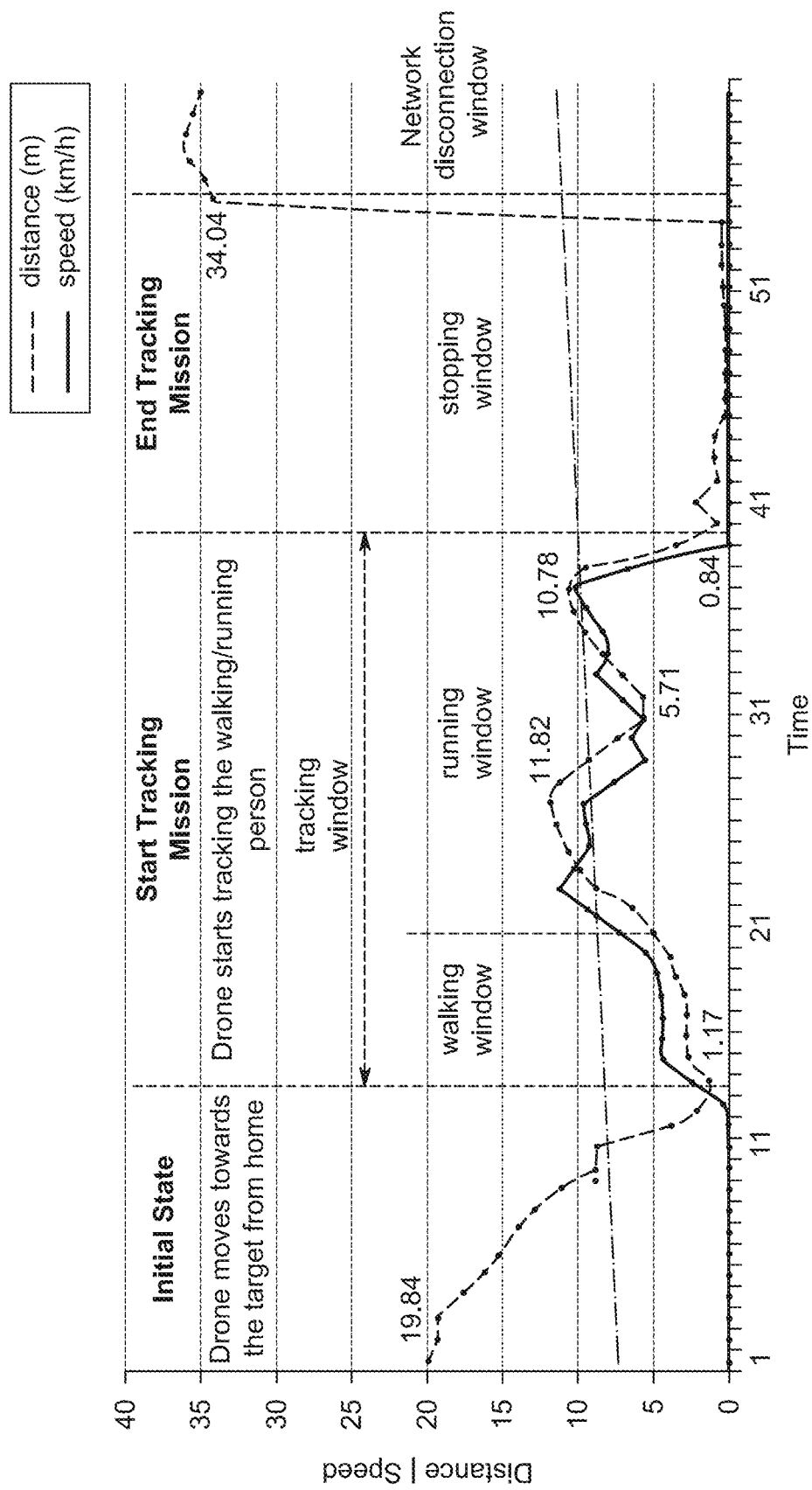
FIG. 25 is a graph of tracking distance and time for the drone tracking application in accordance with an exemplary aspect of the disclosure.

FIG. 25 shows the results of the experiments. Initially, the drone was located at home location 20 m away from the moving person. Then, when it received the tracking request, it moved towards the moving person until flying on top of him at the same location. When the moving person was walking at slow speed, the tracking distance was below 4 m in average, and during the running time window, it increased to 11.82 m. It is observed that speed (blue curve) and tracking distance (black curve) are correlated. The loss of connection in the stopping window was due to the mobile phone going into a sleep mode. This resulted in interrupting the tracking mission and tracking distance reached 34 m.

Figure 26:
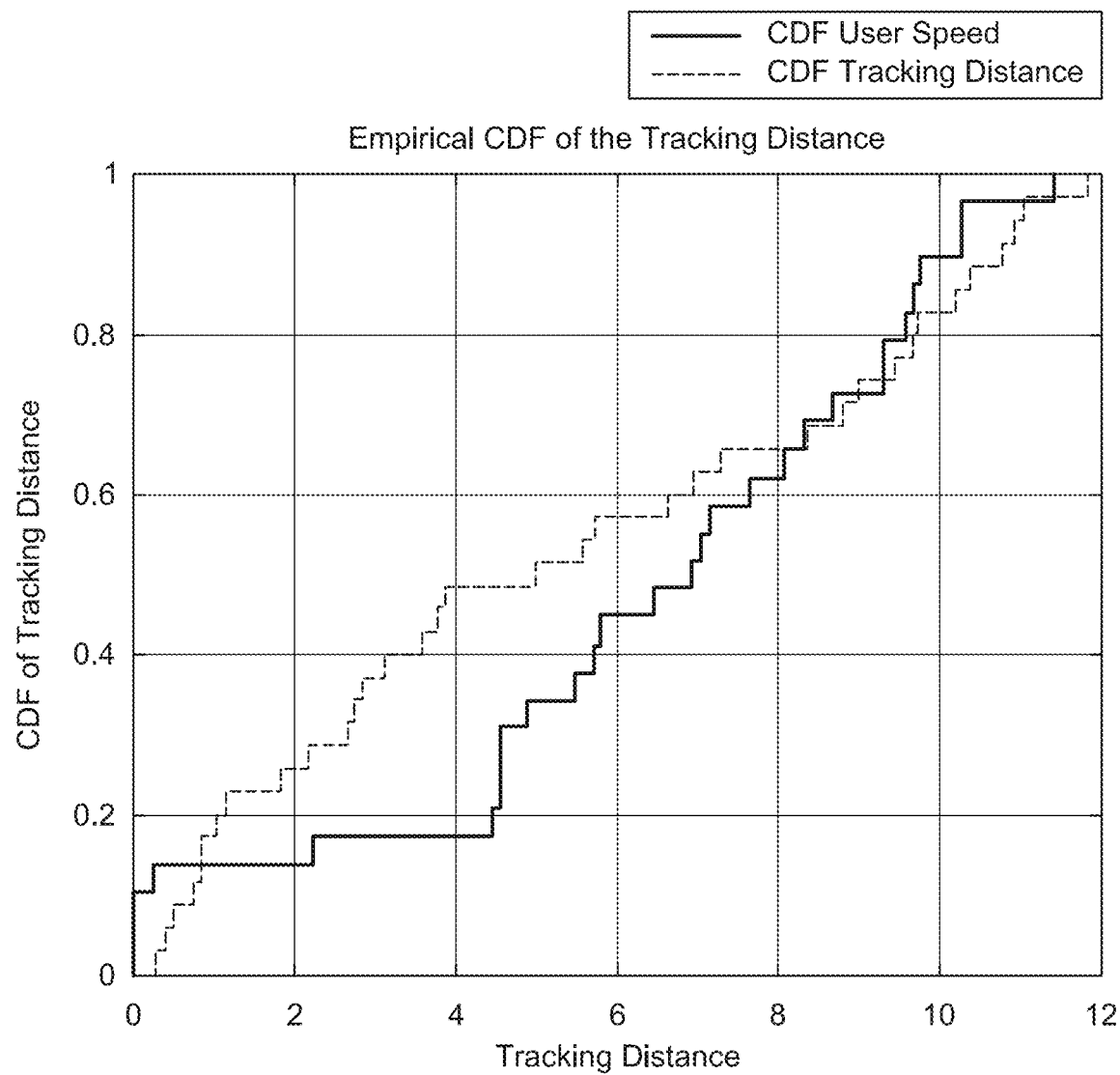
FIG. 26 is a graph of tracking distance for the drone tracking application in accordance with an exemplary aspect of the disclosure.

FIG. 25 shows the tracking window of Scenario 1 involving a walking person and a real drone. FIG. 26 shows the cumulative distribution function of the tracking distance during the tracking window shown in FIG. 25.

The correlation between the speed and the distance can be clearly observed when comparing the blue curve of the speed and the black curve of the tracking distance in FIG. 25.

At first, the person starts walking in the football field, he abruptly starts running for a short period and then resumes walking. The running window in FIG. 25 shows an increase of the distance up to 11.82 m, then abruptly, the distance decreases to 5.71 m as soon as the moving person starts walking back, finally the distance goes back to 10.78 m when running. The gap between the two curves represents the network delay as the drone will respond to new location and move towards it as soon as a new GPS location is received by the drone. The coefficient of variation of the tracking distance is as high as 0.86 which is due to the variation of the speed in walking and running during the experiments.

Figure 27:
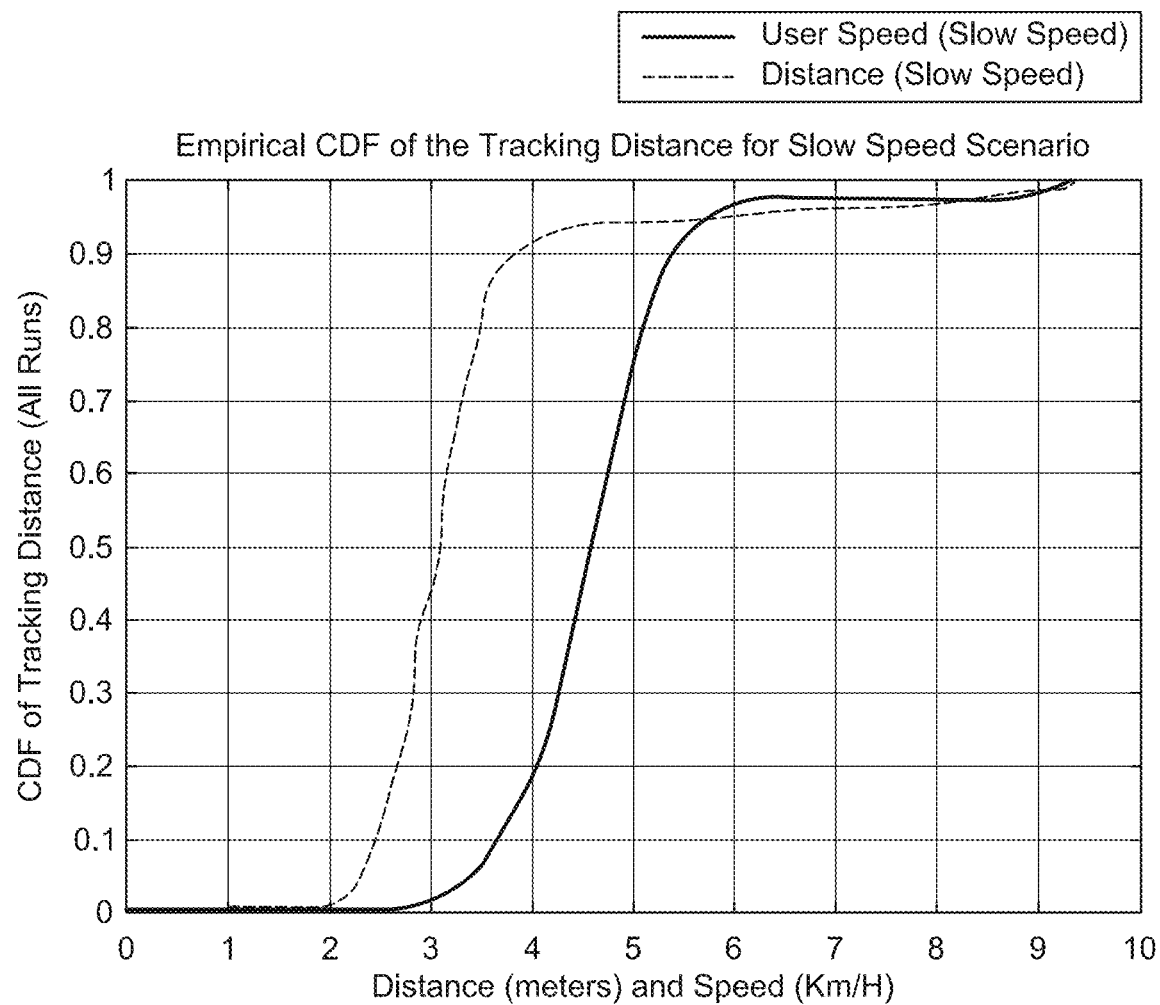
FIG. 27 is a graph of tracking distance at slow constant speed in accordance with an exemplary aspect of the disclosure.

Other experiments were conducted with a person moving with a slow constant speed (below 5 km/h) and results are illustrated in FIG. 27, which presents the CDF of the tracking distance. It can be clearly observed that the tracking distance is strictly lower than 4 in in 90%, with an average tracking distance of 3 m.

The results demonstrate that the cloud-based system is a cloud robotics solution that is able to provide an acceptable quality of service for soft real-time applications. The tracking accuracy can further be improved by increasing the frequency of updating GPS coordinates of the moving person and controlling more the end-to-end delays.

It is noted that it is possible to improve the accuracy of tracking application and compensate more the delays by adding additional sensors like cameras and using filtering techniques (like extended Kalman filters) for sensor fusion to reduce the measurement noise and use predictions in addition to measurements.

Controlling any real-time system over the network will impose that the network provides a reliable quality of service, otherwise, the real-time system will not operate correctly. This is a common fact for all networked control systems, including the Internet-of-Drones.

When it comes to controlling drones over the Internet, the same challenges remain open for such a control, but two situations are differentiated: (1) hard real-time control, (2) soft real-time control. Hard real-time control will require zero fault and zero deadline misses, otherwise the system may crash. These constraints impose the usage of a very reliable and high quality-of-service network. For example, controlling a drone using a joystick over the Internet may be very risky as missing one command, or having a command with an excessive delay may result in crashing the drone against a wall. This can be overcome by implementing a smart onboard autonomous system on the drone to take appropriate actions to avoid crashes when a command is not received (e.g. collision avoidance systems).

On the other hand, the control of drones over the Internet may impose soft real-time constraints or even no real-time constraints. For example, sending a list of waypoints to the drone, and then flying it in autonomous navigation mode with passive monitoring, does not impose any real-time constraints, as the Internet will be used simply to deliver offline commands to the drone. Another example, would be the tracking application that is disclosed which involves soft real-time constraints, as missing some messages will just result in a temporary increase of the tracking error, but will not cause any harm or crash to the drone system. In summary, the impact of the latencies and delays on the performance of the Internet of drones depend on different parameters including the strictness of the real-time constraints, the type of application, the quality of service provided by the network, and the cloud processing delays. With the exponential evolution of networking infrastructure, the use of cloud robotics for hard real-time control applications will become possible in the future. This area is an open research topic which requires more investigations.

Disclosed embodiments are provided for a cloud-based management system for robots and drones over the Internet-of-Things. The cloud-based system is a comprehensive framework that over the horizon for multiple IoT applications using drones. Several applications are disclosed, namely real-time tracking, and controlling and monitoring drones and robots over the Internet. The concept of Internet-of-Drones and its security aspects were disclosed. The performance of the cloud-based system was also evaluated in terms of real-time guarantee. It was demonstrated that the cloud-based system exhibits good performance for real-time applications.

One of the potential usages of the cloud-based system is in the context BVLOS (Beyond Visual Line of Sight) operations of drones which represents the next major challenge for commercial applications using drones, such as delivery, surveillance. In fact, the cloud-based system allows to remotely control and monitor the drones anywhere and anytime without having to be in the visual light of sight with the drone. However, this induces security threats and safety risks that must be taken into account. One of the initiatives in this respect is that NASA has established UAS Traffic Management (UTM) system to ensure safe operation of drones. The cloud-based system helps in implementing these UTM regulations to ensure the safe operation of drones. In fact, the cloud-based system maintains real-time status data about drones during their missions and can apply law enforcement and regulations on drones while flying. For example, it is possible to control the airspace where the drone is allowed to fly and apply geofencing constraints on the drone mission in real-time. It is even possible to adopt adaptive geofencing based on the feedback received from drones and current circumstance during flight operations.

Furthermore, the integration of blockchain technology with drones for the authentication of drones is a promising research direction as authentication and privacy of drones messages is still an open problem, in particular since the cloud-based system operates on cloud premises.

The disclosed cloud-based system may be applied in other applications. First, the cloud-based system may be used for multi-drone task allocation by coordinating the tasks of multiple drones during critical missions. The cloud-based system may include a secure access to drones and to the cloud-based system to mitigate security threats that might compromise the safety of operations of drones during their mission. Micro Air Vehicle Link (MAVLink) is a communication protocol for small unmanned vehicles. MAVLink was released by Lorenz Meier in 2009 under LGPL license. It specifies a set of messages that are exchanged between a small unmanned vehicle and a ground station. One of the main reasons for the wide use of MAVLink by many ground stations and autopilots is that it has a stable message format. One of the most advanced and reliable autopilots that support the MAVLink is Ardupilot. This autopilot is capable of controlling any vehicle system, from airplanes, multirotors, and helicopters, to boats and even submarines. Ardupilot supports several flight modes for drones, including:

STABILIZE (MANUAL): allows to control the vehicle manually using an RC controller.

ALT HOLD: known as altitude hold mode, where the drone maintains a fixed altitude, while the user controls the roll, pitch and yaw.

LOITER: attempts to maintain the current location, heading and altitude. Loiter means "stand or wait around idly or without apparent purpose". This mode requires either a GPS (for outdoor navigation) or optical flow sensor (for indoor navigation) to get and maintain the position.

LAND: allows the drone to land to ground.

RTL: also known as Return-To-Launch. It navigates the drone from its current location to hover above the home location, and then to land.

GUIDED operates only with a GPS and allows to send the drone to a GPS coordinate dynamically through the ground station.

AUTO: in Auto mode the drone follows a pre-programmed flight path stored in the autopilot, which consists of a set of waypoints to visit.

All MAVLink messages contain a header appended to every data payload of the message. The header contains information about the message while the payload contains the data carried out by the message. The total MAVLink message has a length of 17 bytes, which includes 6 bytes for the header, 9 bytes for the payload and 2 bytes for the checksum. The checksum is intended to verify the integrity of the message and that it was not altered during its transmission. The MAVLink message header format is as follow:

Start-of-frame: The header contains a packet start sign encoded into 1 byte, which indicates the start of the packet.

Payload-length: The byte with index 1 corresponds to the payload length, which is encoded on one byte for a value between 0 and 255.

Packet sequence: one Byte with index 2 refers to the packet sequence, which indicates the incremental sequence number of the packet by a value between 0 and 255. If the sequence number reaches 255, it is reset back to zero.

System ID: The system ID is an important parameter, which identifies the system that can be a drone or any vehicle running the autopilot. The fact it is encoded in 8 bits restricts the total number of vehicles on one ground station to 256, including the ground station. The MAVLink protocol imposes that the ground station has a system ID equal to 255. This is how it is recognized in the autopilot running in the monitored vehicle.

Component ID: The component ID is the identifier of the component sending the message inside the system. For the moment, there is no subsystem or component, so it will be of no use.

Message ID: The message ID is an important field. It indicates the type of message being carried out in the payload. For example, if the message ID is 0, this means that the message is of type HEARTBEAT, which is periodically, every 1 second, sent to indicate that the system is active. Another example, if the message ID is 33, this indicates that the payload carries out GPS coordinate of the system.

Payload: The data into the message, depends on the message ID.

CRC: Check-sum of the packet. To ensure message integrity and to ensure the sender and receiver both agree in the message that is being transferred.

The payload from the packets are MAVLink messages. Every message is identifiable by the ID field on the packet, and the payload contains the data from the message. Several control and state messages are defined in MAVLink protocol. In what follows, a sample of the main MAVLink messages is presented. For a complete set of messages, the reader may refer to MAVLink Common Message set specifications. See MAVLink Common Message set specifications, (//pixhawk.ethz.ch/mavlink/). Accessed: Jun. 3, 2017, incorporated herein by reference in its entirety.

The HEARTBEAT message is the most important message in MAVLink (refer to Listing 2 in FIG. 28). It indicates the presence of the vehicle system and that it is active. A vehicle should send the HEARTBEAT message periodically (generally every second) to the ground station to tell the latter that it is alive. This is a mandatory message. The System Status message (refer to Listing 3 in FIG. 28) with a message ID equal to 1 carries information about the onboard control sensors present in the drone, and which one are enabled or disabled. It also provides information about the battery status and the remaining voltage. In addition, it provides information about the communication errors. The message (refer to Listing 4 in FIG. 28) with an id equal to 33 represents the filtered GPS location given by the GPS. The important information carried in this message is the latitude, longitude, and the altitude, all of them encoded into 4 bytes (32 bits). The values of latitude and longitude are multiplied by $10^7$, so to get the real value divide by $10^7$. The altitude is expressed in millimeters. It also provides information about the speed of the drone around the 3 axes in addition to orientation referred to as heading.

ROSLink is a lightweight communication protocol that allows the control of ROS-enabled robots through the Internet. See Koubâa et al. The integration of robots with the Internet is essential to advance new sorts of cloud robotics applications where robots are virtualized and controlled through the Internet. For example, in previous work, a personal assistant robot was developed for providing home and office services using ROS. See A. Koubâa, M. F. Sriti, Y. Javed, M. Alajlan, B. Qureshi, F. Ellouze, A. Mahmoud, Turtlebot at office: A service-oriented software architecture for personal assistant robots using ros, in: Proceedings of 2016 International Conference on Autonomous Robot Systems and Competitions (ICARSC), Bragança, Portugal, 2016, pp. 270-276, doi: 10.1109/ICARSC.2016.66, incorporated herein by reference in its entirety. However, the communication between the robot and the end-user was constrained to the scope of a local area network (LAN), which presented a limitation. The ROSLink was developed to allow Internet connectivity of ROS-enabled robots.

ROSLink makes a complete abstraction of ROS by providing all information about the robot through ROS topics/services without exposing ROS ecosystem to the users. It defines a set of interfaces for the users to interact with the robot, and a set of messages to exchange between them. ROSLink provides asynchronous communication as 3-tier architecture between the robots and the end-users through the cloud. It is composed of (1) ROSLink Bridge client in the robot side, (2) ROSLink Proxy acts as a server in the ground station, and (3) client application at the user side which interacts with the robot through the ROSLink protocol. ROSLink Bridge is a ROS node that accesses all topics and services of interest in ROS, and sends selected information in ROSLink messages, serialized in JSON format.

ROSLink messages contain information about the command and its parameters. To standardize the type of messages exchanged, a set of ROSLink messages was specified that are supported by the ROSLink Proxy. These messages can be easily extended based on the requirements of the user and the application. There are two main categories of ROSLink messages: (i.) State messages: these are message sent by the robot and carry out information about the internal state of the robot, including its position, orientation, battery level, etc. (ii.) Command messages: these are messages sent by the client application to the robot and carry out commands to make the robot execute some actions, like for example moving, executing a mission, going to a goal location, etc.

The most basic ROSLink message is the Heartbeat message, which is sent periodically from the robot to the ROSLink proxy server, and vice-versa. Every ROSLink Bridge should implement the periodic transmission of the Heartbeat message. The objective of the Heartbeat message is for the proxy server to ensure that the robot is active and connected, upon reception of that message. In the same way, a robot that receives a Heartbeat message from the ROSLink Proxy server ensures that the server is alive. This message increases the reliability of the system when it uses a UDP connectionless protocol, such that both ends make sure of the activity of the other end. Failsafe operations can be designed when the robot loses reception of Heartbeat messages from the user such as stopping motion or returning to start location until connectivity is resumed.

The Heartbeat message structure is defined in JSON representation in Listing 5 in FIG. 29. In the ROSlink protocol, the message_id of the Heatbeat message is set to zero. The Robot Status message contains the general system state, like which onboard controllers and sensors are present and enabled in addition to information related to the battery state. Listing 6 in FIG. 29 presents the Robot Status message structure, which has a message_id equal to 1. The Global motion message represents the position of the robot and its linear and angular velocities. This information is sent to the ROSLink client at high frequency to keep track of robot motion state in real-time. An instance of the Global motion message structure is expressed in Listing 7 in FIG. 29.

Listing 8 in FIG. 30 presents the Range Finder Data message, which carries out information and data about laser scanners attached to the robot. The Range Finder Data sensor information enables to develop control application on the client through the cloud, such as obstacle avoidance reactive navigation, SLAM, etc.

Numerous modifications and variations of the present invention are possible in light of the above teachings. It is therefore to be understood that within the scope of the appended claims, the invention may be practiced otherwise than as specifically described herein.

The invention claimed is:

1. An internet protocol-based unmanned aerial vehicle (UAV) management system, the system comprising:
at least one UAV including a communication chip for communication using an Internet protocol;
a client device configured to communicate using the Internet protocol;
a cloud-based service having circuitry for performing at least one virtual UAV corresponding to the at least one UAV, the circuitry configured to
store in a cloud-based memory a plurality of pre-planned missions including surveillance, disaster recovery, delivery, and premises security, each pre-planned mission including at least one task to be performed by the at least one UAV, and
control communication between the at least one UAV and the client device using the Internet protocol;
the client device configured to
assign a mission of the plurality of pre-planned missions to include multiple waypoints, and
allocate the at least one task at the multiple waypoints;
the cloud-based service configured to
map each of the at least one UAV to a respective one of the at least one virtual UAV,
perform dynamic mission planning of the assigned mission to generate planned paths for performing the at least one task over the multiple waypoints, and
perform dynamic mission re-planning of the assigned mission to update the planned paths when a failure happens in executing the assigned mission;
the circuitry further configured to control operation of the at least one UAV by way of the mapped virtual UAV that
receives messages and commands for the mission from the client device using the Internet protocol,
sends control commands in a secure manner to the at least one UAV using the Internet protocol,
receives data signals in the secure manner that have been captured by the at least one UAV and sends the received data signals to the cloud-based service, and
transmits location and status of performance of the at least one task for the at least one UAV;
the cloud-based service configured to perform image processing using the received data signals and to send back a result of the image processing to at least one of the client device or the at least one UAV;
the virtual UAV configured to perform data streaming to receive a video stream from the at least one UAV; and
the cloud-based service further configured to apply one or more deep learning algorithms on the received video stream.

2. The system of claim 1, wherein the client device includes a software application programming interface (API) client interface that connects to a software API interface of the cloud-based service to receive real-time updates of status data of the at least one UAV.

3. The system of claim 1, wherein the virtual UAV includes a service oriented architecture that sends commands from the virtual UAV to the at least one UAV.

4. The system of claim 1, wherein the virtual UAV is accessed by the client device through Web services performed by the circuitry.

5. The system of claim 1, wherein the virtual UAV maintains the status of the at least one UAV, and
wherein the status of the at least one UAV is updated whenever a message is received from the at least one UAV.

6. The system of claim 1, wherein the dynamic mission planning performed by the cloud-based service includes processing sensor data received from the at least one UAV to identify an event.

7. The system of claim 1, wherein the dynamic mission planning performed by the cloud-based service includes planning and communicating routes of UAVs of the at least one UAV in order to avoid collision between the UAVs.

8. The system of claim 1, wherein the dynamic mission planning performed by the cloud-base service includes controlling routes of UAVs of the at least one UAV by using virtual perimeters in the virtual UAVs to maintain the routes to stay within predefined geographic boundaries.

9. The system of claim 1, wherein the circuitry configured to control communication between the at least one UAV and the client device using the Internet protocol maintains an identification for the at least one UAV that is a combination of the Internet protocol address of the at least one UAV, and a system assigned ID.

10. A method for Internet protocol-based control of unmanned aerial vehicles (UAV), in which a management system includes
at least one of the UAVs including a communication chip for communication using the Internet protocol,
a client device configured to communicate using the Internet protocol, and
a cloud-based service having circuitry for performing at least one virtual UAV corresponding to the at least one UAV, the method comprising:
storing in a cloud-based memory a plurality of pre-planned missions including surveillance, disaster recovery, delivery, and premises security, each pre-planned mission including at least one task to be performed by the at least one UAV;
controlling communication between the at least one UAV and the client device using the Internet protocol;
mapping, by the cloud-based service, the at least one UAV to the at least one virtual UAV;
assigning, by the client device, a mission of the plurality of pre-planned missions to include multiple waypoints;
allocating, by the client device, the at least one task at the multiple waypoints;
performing, by the cloud-based service, dynamic mission planning of the assigned mission to generate planned paths for performing the at least one task over the multiple waypoints;
performing, by the cloud-based service, dynamic mission re-planning of the assigned mission to update the planned paths when a failure happens in executing the assigned mission;
controlling operation of the at least one UAV by way of the mapped virtual UAV including
receiving messages and commands for the mission from the client device using the Internet protocol,
sending control commands in a secure manner to the at least one UAV using the Internet protocol,
receiving data signals in the secure manner that have been captured by the at least one UAV and sending the received data signals to the cloud-based service, and
transmitting location and status of performance of the at least one task for the at least one UAV;
performing, by the cloud-based service, image processing using the received data signals;
sending back, by the cloud-based service, a result of the image processing to at least one of the client device or the at least one UAV;
performing, by the virtual UVA, data streaming to receive a video stream from the at least one UAV; and
performing, by the cloud-based service, one or more deep learning algorithms on the received video stream.

11. The method of claim 10, wherein the client device includes a software application programming interface (API) client interface,
the method further comprising:
connecting via the software API client interface of the client device to a software API interface of the cloud-based service; and
receiving, by way of the connection, real-time updates of status data of the at least one UAV.

12. The method of claim 10, wherein the virtual UAV includes a service oriented architecture,
wherein the method further includes sending commands from the virtual UAV to the at least one UAV via the service oriented architecture.

13. The method of claim 10, further comprising:
accessing the virtual UAV by the client device through Web services performed by the circuitry.

14. The method of claim 10, wherein the virtual UAV maintains the status of the at least one UAV,
the method further comprising:
updating, by the virtual UAV, the status of the at least one UAV whenever a message is received from the at least one UAV.

15. The method of claim 10, wherein the performing the dynamic mission planning includes processing sensor data received from the at least one UAV to identify an event.

16. The method of claim 10, wherein the performing the dynamic mission planning includes planning and communicating routes of UAVs of the at least one UAV in order to avoid collision between the UAVs.

17. The method of claim 10, wherein the performing the dynamic mission planning includes controlling routes of UAVs of the at least one UAV by using virtual perimeters in the virtual UAVs to maintain the routes to stay within predefined geographic boundaries.

18. The method of claim 10, wherein the controlling communication between the at least one UAV and the client device using the Internet protocol includes maintaining an identification for the at least one UAV that is a combination of the Internet protocol address of the at least one UAV, and a system assigned ID.

* * * * *